(12) United States Patent
Takebayashi et al.

(10) Patent No.: US 7,947,914 B2
(45) Date of Patent: May 24, 2011

(54) BICYCLE SHIFT OPERATING DEVICE

(75) Inventors: Haruyuki Takebayashi, Osaka (JP); Kazuhiro Fujii, Osaka (JP)

(73) Assignee: Shimano Inc., Osaka (JP)

( * ) Notice: Subject to any disclaimer, the term of this patent is extended or adjusted under 35 U.S.C. 154(b) by 985 days.

(21) Appl. No.: 11/776,208

(22) Filed: Jul. 11, 2007

(65) Prior Publication Data
US 2008/0121066 A1 May 29, 2008

(30) Foreign Application Priority Data

Nov. 29, 2006 (JP) ................................ 2006-322077

(51) Int. Cl.
*H01H 9/06* (2006.01)
(52) U.S. Cl. ................. 200/61.88; 200/11 R; 200/61.85
(58) Field of Classification Search .................. 200/5 B, 200/6 R, 11 R–11 TW, 61.27, 61.28, 61.54, 200/61.57, 61.85, 61.88, 570, 571, 329, 335, 200/336; 74/501.6, 502.2, 473.3, 473.12, 74/473.131; 474/80; 280/261
See application file for complete search history.

(56) References Cited

U.S. PATENT DOCUMENTS

| | | | |
|---|---|---|---|
| 4,041,788 A | 8/1977 | Nininger, Jr. | |
| 4,850,939 A | 7/1989 | Chilcote et al. | |
| 6,227,068 B1 * | 5/2001 | Masui et al. | ................. 74/473.3 |
| 6,564,670 B2 * | 5/2003 | Feng et al. | ................... 74/502.2 |
| 7,291,798 B2 * | 11/2007 | Yagi | ............................... 200/553 |
| 7,350,436 B2 * | 4/2008 | Fujii | ............................ 74/473.13 |
| 2001/0012978 A1 * | 8/2001 | Jinbo et al. | ..................... 701/70 |
| 2005/0043129 A1 * | 2/2005 | Guderzo | ........................ 474/78 |
| 2005/0255950 A1 * | 11/2005 | Takebayashi et al. | .......... 474/70 |
| 2006/0116227 A1 | 6/2006 | Mercat et al. | |

FOREIGN PATENT DOCUMENTS

| | | |
|---|---|---|
| EP | 0 834 685 A2 | 4/1998 |
| EP | 1 245 483 A2 | 10/2002 |
| EP | 1 473 221 A2 | 11/2004 |
| EP | 1 568 597 A1 | 8/2005 |
| EP | 1 705 110 A1 | 9/2006 |
| JP | 2002-267002 | 9/2002 |

* cited by examiner

*Primary Examiner* — Michael A Friedhofer
(74) *Attorney, Agent, or Firm* — Global IP Counselors, LLP

(57) ABSTRACT

A bicycle shift operating device is provided with a mounting part, a first operating member and a first signal generator. The first operating member is movable from a first operation start position such that the first operating member returns to the first operation start position upon completion of a shifting operation. The first signal generator generates a signal for changing a shift position of the bicycle shift operating device by one shift position in a first direction from a current shift position in response to the first operating member being moved from the first operation start position to a first position. The first signal generator generates a signal for changing the shift position by two shift positions from the current shift position in response to the first operating member being moved from the first operation start position to a second position located beyond the first position.

16 Claims, 11 Drawing Sheets

BICYCLE SHIFT OPERATING DEVICE

CROSS-REFERENCE TO RELATED APPLICATIONS

This application claims priority under 35 U.S.C. §119 to Japanese Patent Application No. 2006-322077, filed Nov. 29, 2006. The entire disclosure of Japanese Patent Application No. 2006-322077 is hereby incorporated herein by reference.

BACKGROUND OF THE INVENTION

1. Field of the Invention

This invention generally relates to a shift operating device, particular a bicycle shift operating device configured such that it can be mounted to a handlebar of a bicycle and serving to operate a bicycle shifting device capable of being electrically controlled.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycle gear shifting control systems have been extensively redesigned so as to be electrically operated.

In particular, bicycle gear shifting systems have been proposed that are electrically powered and configured to be controlled electrically so as to change among a plurality of shift positions. This kind of electrically powered gear shifting device is operated with a shift operating device that can be mounted to a handlebar (e.g., Japanese Laid-Open Patent Publication No. 2002-267002). A conventional shift operating device for such an electrically powered bicycle shift operating device is intended to be used with an externally mounted bicycle shift operating device having front and rear derailleurs that can be controlled electrically. Similarly to cable-type shift operating devices, the conventional shift operating device has a shift operating device for the rear derailleur arranged on one side of the handlebar and a shift operating device for the front derailleur arranged on the other side of the handlebar. Each of the shift operating devices has two vertically arranged switches, one for upshifting and one for downshifting. The switches are, for example, push-button switches and are configured such that the bicycle shifting device shifts one gear in the upshift direction when the upshift switch is pressed and one gear in the downshift direction when the downshift switch is pressed.

With the conventional configuration described above, the bicycle shift operating device changes a shift position by only one gear (moves to the adjacent shift position) each time the shift operating device is operated. Consequently, when a rider attempts to change the shift position by two or more positions at once (change between non-adjacent gears) in order to accelerate or decelerate rapidly, the switches of the shift operating device must be operated multiple times and the gear shift operation becomes troublesome.

Additionally, since the conventional shift operating devices are operated using switches, it is possible for the switches to turn on and off due to vibrations occurring during riding, thus increasing the frequency of unintended gear change operations.

In view of the above, it will be apparent to those skilled in the art from this disclosure that there exists a need for an improved shift operating device. This invention addresses this need in the art as well as other needs, which will become apparent to those skilled in the art from this disclosure.

SUMMARY OF THE INVENTION

One object of the present invention is to provide a shift operating device for operating an electrically powered bicycle shifting device that is capable of changing the shift position by two or more positions with only one operation of the shift operating device.

Another object of the present invention is to provide a shift operating device for operating an electrically powered bicycle shifting device that prevents unintentional operation of the shifting device due to vibrations.

A bicycle shift operating device in accordance with a first aspect of the present invention is provided for operating an electrically controlled bicycle shifting device. The bicycle shift operating device basically comprises a mounting part, a first operating member, and a first signal generator. The mounting part is configured to be mounted to a bicycle handlebar. The first operating member is movable relative to the mounting part from a first operation start position such that the first operating member returns to the first operation start position upon completion of a shifting operation. The first signal generator is configured to generate a signal for changing a shift position of the bicycle shifting device by one shift position in a first direction from a current shift position in response to the first operating member being moved from the first operation start position to a first position. The first signal generator is further configured to generate a signal for changing the shift position of the bicycle shifting device by two shift positions from the current shift position in response to the first operating member being moved from the first operation start position to a second position located beyond the first position.

With this shift operating device, in response to the first operating member being moved from the first operation start position to the first position, the first signal generator generates a signal for changing the shift position of the bicycle shifting device in a first direction (e.g., a downshift direction or an upshift direction) by one position from the current shift position. The signal is fed to, for example, a shift controller. When operation of the first operating member ends, the first operating member returns to the first operation start position. In response to the first operating member being moved from the first operation start position to a second position lying beyond the first position, the first signal generator generates a signal for changing the shift position by two gears. With this aspect of the invention, the first operating member can be moved from the first operation start position to a first position or to a second position located beyond the first position and the shift position of the bicycle shifting device can be changed by one gear or two gears by moving the first operating member to the first position or the second position, respectively. Thus, the bicycle shifting device can be controlled so as to change by a plurality of shift positions in the first direction with a single operation of the shift operating device.

A bicycle shift operating device in accordance with a second aspect of the present invention is a bicycle shift operating device in accordance with the first aspect, wherein the first signal generator is further configured to generate a signal for changing the shift position of the bicycle shifting device by three shift positions from the current shift position in response to the first operating member being moved from the first operation start position to a third position located beyond both the first position and the second position. With this aspect of the invention, the bicycle shifting device can be shifted across three shift positions, e.g., from second speed to fifth speed, with a signal operation of the shift operating device.

A bicycle shift operating device in accordance with a third aspect of the present invention is a bicycle shift operating device in accordance with the first or second aspect, wherein the first operating member is pivotally connected to the mounting part to pivot about a first axis. With this aspect of the invention, the first operating member can be mounted to the mounting part easily because it can be mounted to the mounting part by a shaft such that it pivots about a first axis.

A bicycle shift operating device in accordance with a fourth aspect of the present invention is a bicycle shift operating device in accordance with the third aspect, wherein the mounting part includes a body portion and a support member pivotally connected to the body portion to pivot about a second axis that is non-aligned with respect to the first axis. The first operating member is pivotally connected to the support member to pivot about the first axis and connected to the support member to pivot together with the support member about the second axis to perform a braking operation. With this aspect of the invention, both brake operation and gear shifting in the first direction can be accomplished with the first operating member.

A bicycle shift operating device in accordance with a fifth aspect of the present invention is a bicycle shift operating device in accordance with any one of the first to fourth aspects, wherein the first signal generator includes: a first movable contact and a first stationary contact. The first movable contact is operatively connected to the first operating member to move in accordance with movement of the first operating member. The first stationary contact is non-rotatably mounted relative to the mounting part to selectively contact and separate from the first movable contact. With this aspect of the invention, operating positions of the first operating member (e.g., the first and second positions) can be set to any desired position in the movement direction.

A bicycle shift operating device in accordance with a sixth aspect of the present invention is a bicycle shift operating device in accordance with any one of the first to fifth aspects, further comprising: a second operating member and a second signal generator. The second operating member is movable relative to the mounting part from a second operation start position such that the second operating member returns to the second operation start position upon completion of a shifting operation. The second signal generator is configured to generate a signal for changing the shift position of the bicycle shifting device by one position in a second direction from the current shift position in response to the second operating member being moved from the second operation start position to a fourth position. The second signal generator is further configured to generate a signal for changing the shift position of the bicycle shifting device by two positions from the current shift position in response to the second operating member being moved from the second operation start position to a fifth position located beyond the fourth position.

A bicycle shift operating device in accordance with a seventh aspect of the present invention is a bicycle shift operating device in accordance with the sixth aspect, wherein the second operating member is pivotally connected to the mounting part to pivot about the first axis. With this aspect of the invention, the two operating members can be mounted more easily because they are configured to pivot about the same axis.

A bicycle shift operating device in accordance with a seventh aspect of the present invention is a bicycle shift operating device in accordance with the sixth aspect, wherein the first and second operating members pivot in the same direction from the first and second operation start positions to the first and fourth positions, respectively. With this aspect of the present invention, a rider can operate the shift operating device without experiencing an awkward feeling because the shift operating device can be operated in the same manner as a conventional cable-type mechanical shift operating device incorporated into a brake operating device (a brake operating device provided with a gear shifting function).

A bicycle shift operating device in accordance with a ninth aspect of the present invention is a bicycle shift operating device in accordance with any one of the sixth to eighth aspects, wherein the second signal generator includes a second movable and a second stationary contact. The second movable contact is operatively connected to the second operating member to move in accordance with movement of the second operating member. The second stationary contact is non-rotatably mounted relative to the mounting part to selectively contact and separate from the second movable contact. With this aspect of the invention, similarly to the fifth aspect regarding the first operating member, operating positions of the second operating member (e.g., the fourth and fifth positions) can be set to any desired position in the movement direction.

A bicycle shift operating device in accordance with a tenth aspect of the present invention is a bicycle shift operating device in accordance with the ninth, wherein the second operating member is pivotally connected to the first operating member to pivot independently of the first operating member when the second operating member pivots from the second operation start position and to pivot integrally with the first operating member when the first operating member pivots from the first operation start position. With this aspect of the invention, the second operating member can be used to return the first operating member to the first operation start position.

A bicycle shift operating device in accordance with an eleventh aspect of the present invention is a bicycle shift operating device in accordance with any one of the first to tenth aspects, further comprising a position indicating mechanism configured to provide an indication of the operating position of the first operating member. The position indicating mechanism is configured to issue a first indication between the first operation start position and the first position of the first operating member and a second indication between the first position and the second position of the first operating member. With this aspect of the invention, the device informs the rider whether a single gear shift (shift to an adjacent gear) or a double gear shift (shift to a gear two gears away from the current gear) has taken place by means of a distinctive sound, vibration, or the like. The rider can be certain regarding the shift operation that he or she executed.

A bicycle shift operating device in accordance with a twelfth aspect of the present invention is a bicycle shift operating device for operating an electrically controlled bicycle shifting device. The bicycle shift operating device comprises a mounting part, a first operating member, and a first signal generator. The mounting part is configured to be mounted to a bicycle handlebar. The first operating member is movable relative to the mounting part from a first operation start position such that the first operating member returns to the first operation start position upon completion of a shifting operation. The first signal generator has a first movable contact operatively connected to the first operating member to move in accordance with movement of the first operating member and a first stationary contact non-rotatably mounted relative to the mounting part to selectively contact and separate from the first movable contact. The first signal generator is configured to turn on a signal for changing the shift position of the bicycle shifting device by one position in a first direction from the current shift position in response to the first operating member being moved from the first operation start position to a first position. The first signal generator is further configured to turn off the signal in response to the first operating member reaching a position different from the position where the signal was turned on while in the process of returning from the first position to the first operation start position.

With this aspect of the invention, the two contacts move relative to each other in response to the first operating member being moved from the first operation start position to the first position and cause the signal for shifting by one gear (shifting to an adjacent gear) to turn on. Meanwhile, when the first operating member returns from the first position to the first operation start position, the signal is turned off at a position different from the position where the signal was turned on. Since the position along the movement direction of the first operating member where the signal is turned on is different from the position where the signal is turned off, the signal will not turn on and off frequently in the event that the first operating member moves along the movement direction (operating direction) due to vibrations. As a result, unintended operation of the bicycle shifting device resulting from vibrations can be prevented.

A bicycle shift operating device in accordance with a thirteenth aspect of the present invention is a bicycle shift operating device in accordance with any one of the sixth to twelfth aspects, wherein the first stationary contact includes a first pattern, and a second pattern spaced apart from the first pattern along a direction that intersects with a movement direction of the movable contact and offset with respect to the first pattern along the movement direction. With this aspect of the invention, since the first pattern and the second pattern are offset from each other in the movement direction and separated from each other along a direction that intersects with the movement direction, the shift operating device can easily be configured such that the position where the signal turns on and the position where the signal turns off are different.

A bicycle shift operating device in accordance with a fourteenth aspect of the present invention is a bicycle shift operating device in accordance with the thirteenth aspect, wherein the first stationary contact further includes a third pattern spaced apart from the first pattern along the movement direction, and a fourth pattern spaced apart from the second pattern along the movement direction and offset with respect to the third pattern along the movement direction. With this aspect of the invention, different signal on and signal off positions can easily be established for changing the shift position by three positions (shifting to a gear three positions away from the current gear).

With this invention, the first operating member can be moved from the first operation start position to a first position or to a second position located beyond the first position and the shift position of the bicycle shifting device can be changed by one gear or two gears by moving the first operating member to the first position or the second position, respectively. Thus, the bicycle shifting device can be controlled so as to change by a plurality of shift positions in the first direction with a single operation of the shift operating device.

Also, with another aspect of the present invention, since the position along the movement direction of the first operating member where the signal is turned on is different from the position where the signal is turned off, the signal is not turned on and off frequently when the first operating member moves along the movement direction (operating direction) due to vibrations. As a result, unintended operation of the bicycle shifting device resulting from vibrations can be prevented.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
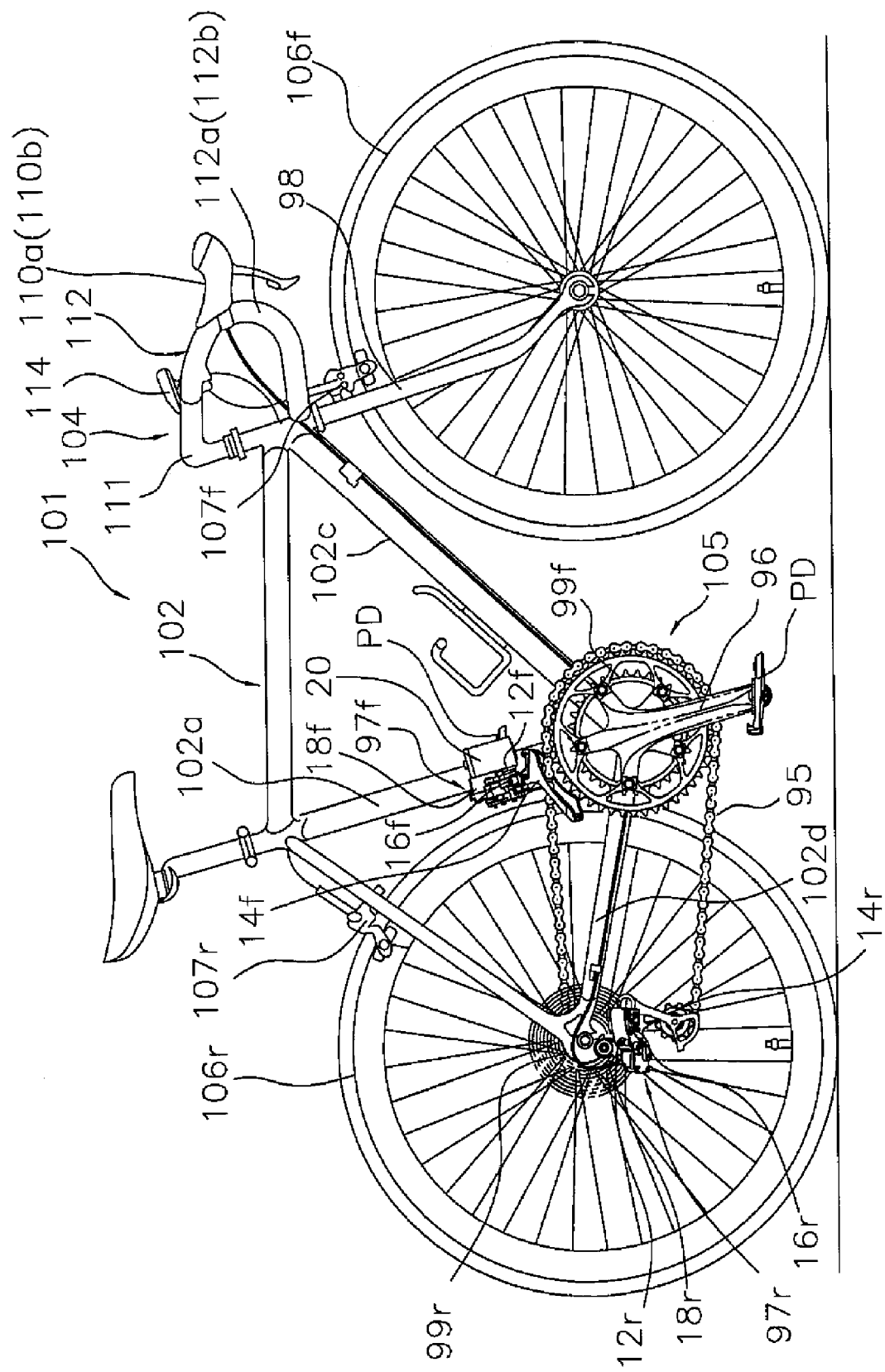
FIG. 1 is a side elevational view of a bicycle having a gear shifting control system with a pair of bicycle brake/derailleur operating units in accordance with a first embodiment of the present invention.

Referring initially to FIG. 1, a bicycle 101 is illustrated in accordance with a first embodiment of the present invention. FIG. 1 shows a bicycle 101 in which an embodiment of the present invention is employed. The bicycle 101 is a "road racer" (racing style road bike). The bicycle 101 basically includes a diamond-shaped frame 102 having a front fork 98, a handlebar unit 104 fastened to the front fork 98, a drive unit 105, a front wheel 106f mounted to the front fork 98 and a rear wheel 106r mounted to a rear portion of the frame 102. The drive unit 105 basically includes a chain 95, a crank 96 on which pedals PD are mounted, a motorized front derailleur 97f, a motorized rear derailleur 97r, a front sprocket cluster 99f, and a rear sprocket cluster 99r. The bicycle 101 also includes a front brake device 107f, a rear brake device 107r, and a pair (left and right) brake/derailleur operating units 110a and 110b configured to control the rear and front derailleurs 97r and 97f, the rear and front brake devices 107r and 107f, respectively. The rear and front derailleurs 97r and 97f are examples of bicycle shifting devices in accordance with one embodiment. The brake/derailleur operating units 110a and 110b are examples of bicycle shift operating devices in accordance with one embodiment.

As shown in FIG. 1, the handlebar unit 104 includes a handlebar stem 111 and a handlebar 112 that is fitted into and fastened to the upper end of the handlebar stem 111. The handlebar stem 111 is fitted into and fastened to an upper part of the front fork 98. The handlebar 112 is a drop-type handlebar having U-shaped curved sections 112a and 112b on both ends thereof, and the curved sections 112a and 112b are arranged such that the curved portions thereof protrude in the forward direction. The brake/derailleur operating units 110a and 110b are mounted on the handlebar 112 for operating the rear and front derailleurs 97r and 97f, the rear and front brake devices 107r and 107f, respectively. The brake/derailleur operating unit 110a is arranged on the right-hand end of the handlebar 112 when the bicycle 101 is viewed from the rear. The brake/derailleur operating unit 110b is arranged on the left-hand end.

The brake/derailleur operating units 110a and 110b are connected to the rear and front brake devices 107r and 107f, respectively, with Bowden-type brake cables (not shown). The brake/derailleur operating units 110a and 110b are also connected to the rear and front derailleurs 97r and 97f, respectively, with electrical wires. A cycle computer 114 is configured to display speed and traveled distance of the bicycle is arranged in a middle portion of the handlebar 112. Thus, the cycle computer 114 functions as a speed indicator.

The front derailleur (FD) 97f is mounted to a seat tube 102a of the frame 102. The front derailleur (FD) 97f is configured such that it can be controlled electrically. In the illustrated embodiment, for example, the front derailleur 97f is configured to selectively move between two shift positions F1 or F2 in response to a gear shifting operation of the brake/derailleur operating unit 110b and to selectively guide the chain 95 onto one of the corresponding sprockets of the front sprocket cluster 99f. The front derailleur 97f basically includes a mounting member 12f, a chain guide 14f and a four-point linkage mechanism 16f. The mounting member 12f is fastened to the seat tube 102a of the frame 102. The chain guide 14f is configured and arranged such that it can be moved toward and away from the mounting member 12f. The four-point linkage mechanism 16f is arranged to connect the chain guide 14f to the mounting member 12f. The front derailleur 97f is operated with an electric drive unit 18f that is arranged and configured to drive the four-point linkage mechanism 16f in such a manner as to move the chain guide 14f.

The rear derailleur (RD) 97r is configured such that it can be controlled electrically. The rear derailleur (RD) 97r is mounted to a rear portion of a chain stay 102d of the frame 102. The rear derailleur 97r is configured to move to, for example, to any one of ten shift positions R1 or R10 in response to gear shifting operations of the brake/derailleur operating unit 110a and to guide the chain 95 onto the corresponding sprocket of the rear sprocket cluster 99r. The rear derailleur 97r basically includes a mounting member 12r, a chain guide 14r and a four-point linkage mechanism 16r. The mounting member 12r is fastened to the rear portion of the chain stay 102d of the frame 102. The chain guide 14r is configured and arranged such that it can be moved relative to the mounting member 12r. The four-point linkage mechanism 16r is arranged to connect the chain guide 14r to the mounting member 12f. The front derailleur 97r is operated with an electric drive unit 18r arranged and configured to drive the four-point linkage mechanism 16r in such a manner as to move the chain guide 14r. A power supply device 20 serving as a power source for the front and rear derailleurs 97f and 97r is mounted to the front derailleur 97.

The front sprocket cluster 99f has a plurality of (e.g., two) sprockets that are arranged along the axial direction of the crank axle and have different tooth counts. The two sprockets are arranged to be aligned with the shift positions F1 and F2. The rear sprocket cluster 99f has a plurality of (e.g., ten) sprockets that are arranged along the axial direction of the hub axle of the rear wheel 106r, and each sprocket has a different tooth count. The ten sprockets are arranged to be aligned with the shift positions R1 and R10.

The sprockets of the front sprocket cluster 99f are arranged such that the sprocket located on the inward side and corresponding to the shift position F1 is a low sprocket and the sprocket located on the outward side and corresponding to the shift position F2 is a top sprocket having a larger tooth count than the low sprocket. The sprockets of the rear sprocket cluster 99r are arranged such that the innermost sprocket corresponding to the shift position R1 is a low sprocket having the most teeth and the outermost sprocket corresponding to the shift position R10 is a top sprocket having the smallest number of teeth. Thus, the tooth counts of the sprockets decrease with each of the sprockets in a direction moving from the inside toward the outside of the cluster (i.e., away from the frame 102).

The brake/derailleur operating units 110a and 110b are configured and arranged to be mirror images of each other, the only difference being the number gears that they are configured to shift. The following explanation will focus chiefly on the brake/derailleur part 110a that is normally arranged on the right side of the drop-type handlebar 112.

Figure 2:
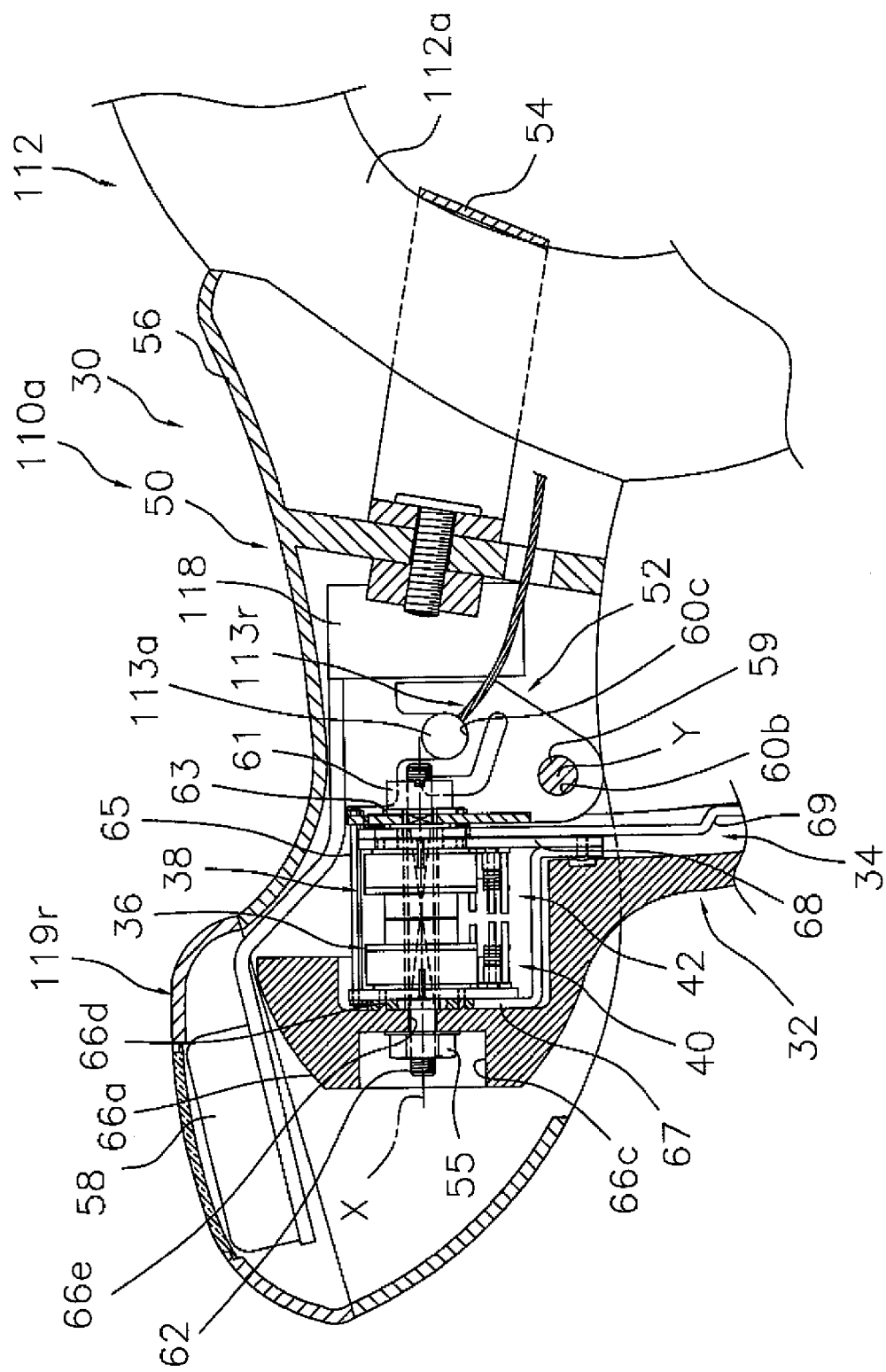
FIG. 2 is an enlarged cross sectional view of one of the brake/derailleur operating units in accordance with the first embodiment.
Figure 3:
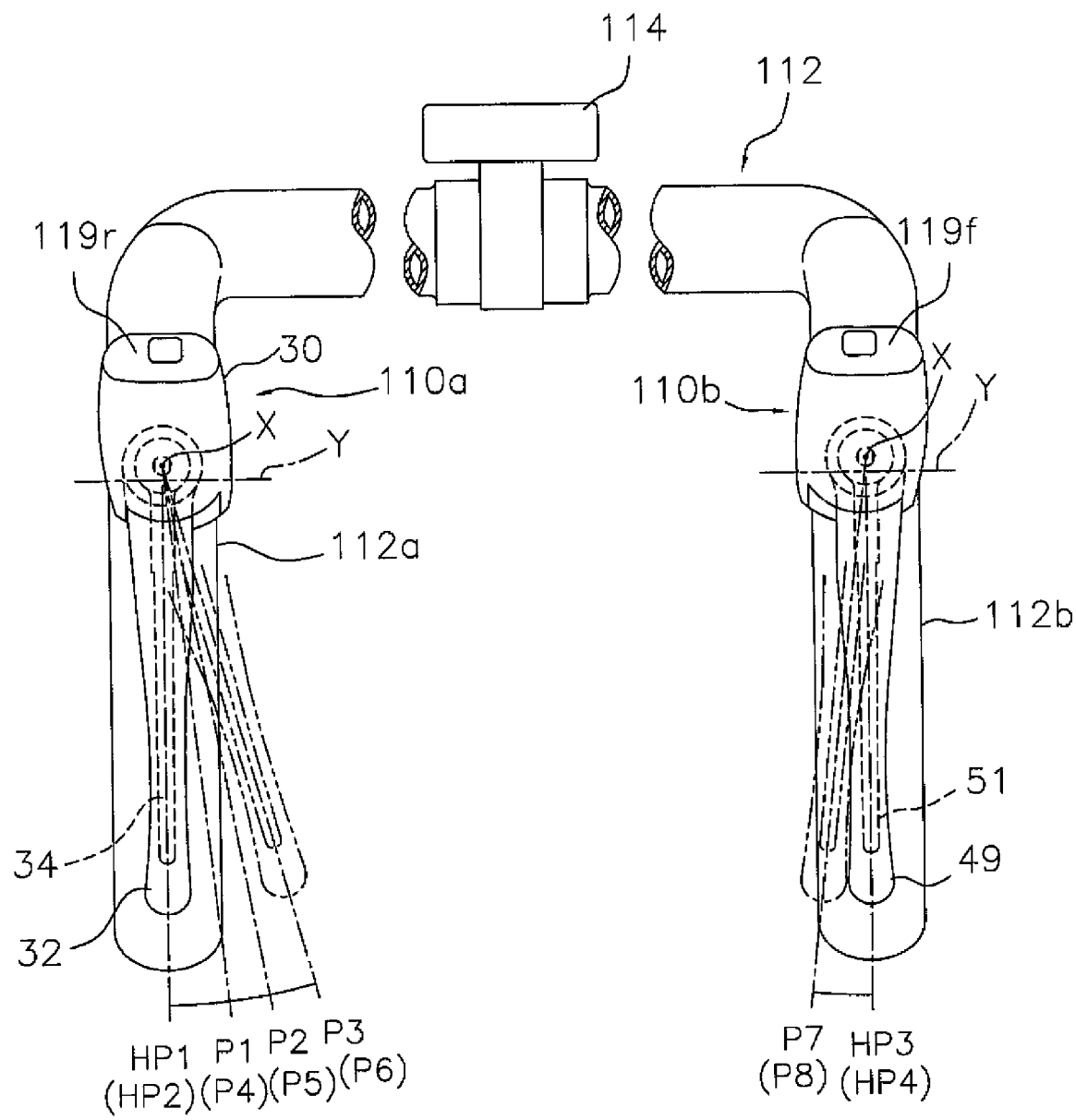
FIG. 3 is a front elevational view of the handlebar of the bicycle with the brake/derailleur operating units in accordance with the first embodiment.
Figure 4:
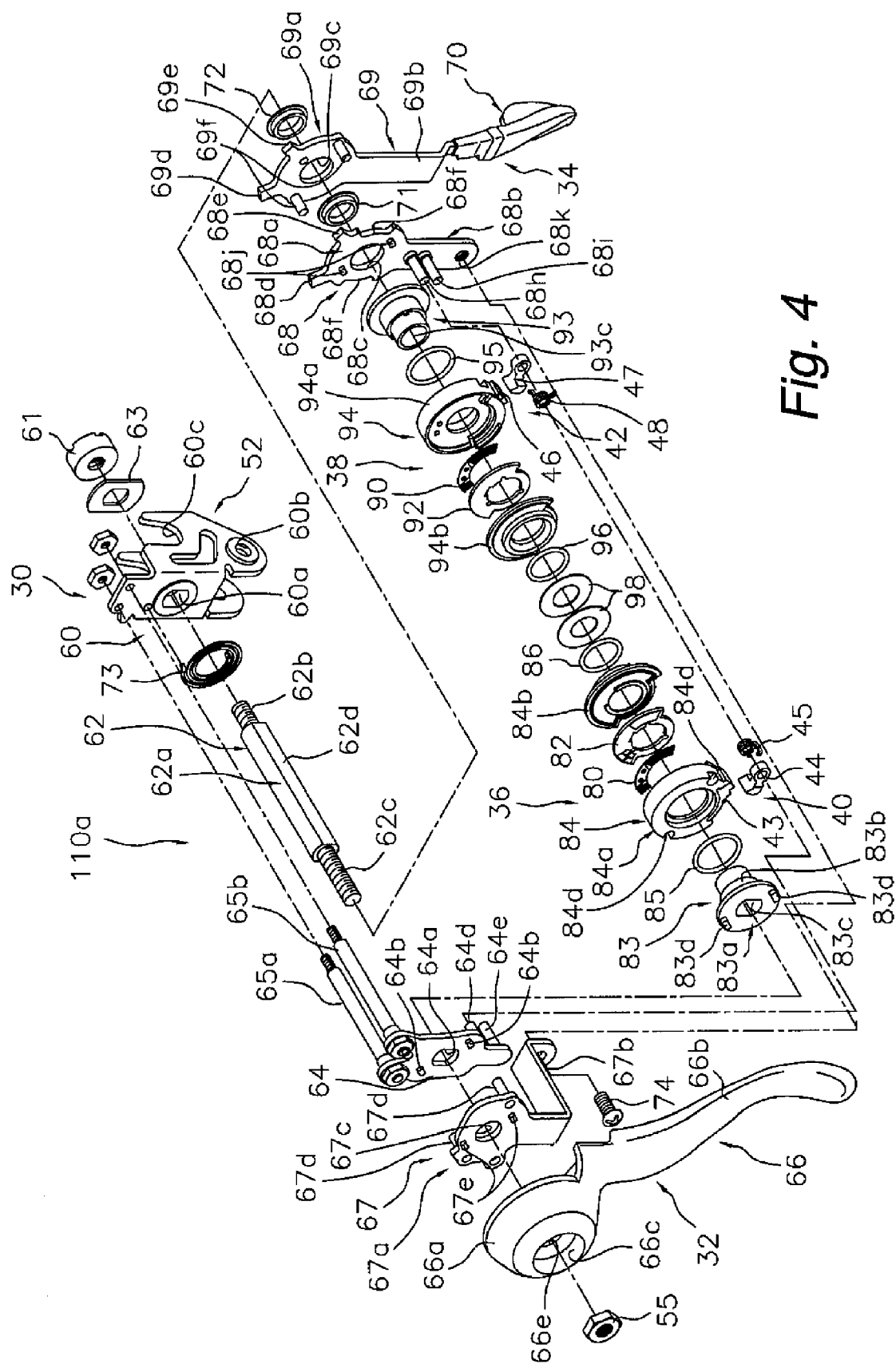
FIG. 4 is an exploded perspective view of one of the brake/derailleur operating units in accordance with the first embodiment.

As shown in FIGS. 2 to 4, the brake/derailleur operating unit 110a is mounted to the curved section 112a of the drop-type handlebar 112 of the bicycle. The brake/derailleur operating unit 110a basically includes a mounting part 30, first and second operating members 32 and 34, first and second signal generators 36 and 38, and first and second position indicating mechanisms 40 and 42. The mounting part 30 is configured such that it can be mounted to the curved section 112a of the drop-type handlebar 112. The first and second operating members 32 and 34 are configured such that they can be arranged along the longitudinal direction with respect to the mounting part 30 and arranged such that they pivot freely about a first axis X. The first and second signal generators 36 and 38 are configured to generate separate signals for gear shifting in a first direction (e.g., a downshift direction) and a second direction (e.g., an upshift direction) in response to movement of the first and second operating members 32 and 34. The first and second position indicating mechanisms 40 and 42 are configured to provide an indication of the operating position of the first or second operating member 32 or 34.

The mounting part 30 basically has a base member 50 and a support member 52. The base member 50 is mounted to the curved section 112a of the handlebar 112. The support member 52 is connected to the base member 50 in such a manner that it can pivot freely about a second axis Y that is skew (non-aligned) with respect to the first axis X. The base member 50 has a clamping portion 54 and a body portion 56. The clamping portion 54 is configured to clamp around the outside of the curved section 112a. The body portion 56 has the clamping portion 54 fixed thereto. A rear shift position display device 119r is mounted to a distal end portion of the body portion 56. The rear shift position display device 119r includes a liquid crystal display 58 that is configured to indicate a shift position (e.g., a gear position). A proximal end portion of the body portion 56 is configured to engage with the curved section 112a. The inside of the body portion 56 has a space configured such that it can house the first and second operating members 32 and 34 and the first and second signal generators 36 and 38. A top portion of the external surface of the body portion 56 is configured such that the palm of the rider's hand can rest thereon when operating the brake. A display control unit 118 is provided inside the body portion 56 near the proximal end of the body portion 56. The display control unit 118 is configured to control the rear shift position display device 119r and a front shift position display device 119f (FIG. 9) provided on the brake/derailleur operating unit 110b.

The support member 52 has a support body 60, a support shaft 62 and a front frame 64. The support shaft 62 is fastened to the support body 60. The front frame 64 is arranged in front of the support body 60 such that a space exists therebetween along the direction of the first axis X. The support body 60 is made of a metal plate-like material that has been bent into a generally C-like shape. The support body 60 is supported in a freely pivotal manner on the body portion 56 by a pivot shaft 59 that is arranged on the body portion 56 in such a fashion as to extend along the second axis Y. The support body 60 has a support shaft mounting hole 60a, a pivot shaft mounting hole 60b and a nipple engaging groove 60c. The support shaft mounting hole 60a is located on a frontward side of the support body 60 and configured for the support shaft 62 to be installed therein. The pivot shaft mounting hole 60b is configured for the pivot shaft 59 to be installed therein. The nipple engaging groove 60c is configured for a nipple 113a on the tip of an inner cable 113r of a brake cable to latch into.

The support shaft 62 is arranged to extend along the first axis X. The support shaft 62 is fastened non-rotatably to the support body 60 with a nut 61 and a washer 63. The support shaft 62 has a shaft section 62a with externally threaded sections 62b and 62c formed on both ends of the shaft section 62a. The shaft section 62a also has a rotation preventing section 62d comprising parallel chamfered sections formed in the outside surface of the shaft section 62a.

The front frame 64 is a plate-like member serving to support the tip end of the support shaft 62 and serving as a place to mount the first signal generator 36 and the first position indicating mechanism 40. The frame 64 is connected to the support body 60 with two connecting shafts 65a and 65b arranged parallel to the first shaft X. The front frame 64 is provided with a support shaft mounting hole 64a and a pair of connecting holes 64b. The support shaft mounting hole 64a is configured for the support shaft 62 to engage non-rotatably therewith. The connecting holes 64b are configured to non-rotatably connect the first signal generator 36 thereto. The frame 64 has a pair of protruding mounting pins 64d and 64e for mounting the first position indicating mechanism 40 on the rear side of the frame 64. The support shaft mounting hole 64a is oval in shape that is configured to engage with the rotation preventing section of the 62d of the support shaft 62 to prevent rotation of the support shaft 62. Each of the connecting holes 64b is a generally oval hole that is spaced radially apart from the support shaft mounting hole 64a and curved in a circular arc shape whose center of curvature coincides with the center of the support shaft mounting hole 64a. The mounting pins 64d and 64e are parallel to each other and arranged to extend rearward.

As shown in FIG. 3, the first operating member 32 is arranged such that it can pivot about the first axis X toward the inward side of the handlebar 112 from a first operation start position HP1 to a first position P1, a second position P2, and a third position P3. The first position P1 and the second position P2 are located between the first operation start position HP1 and the third position P3. The second operating member 34 is arranged such that it can pivot about the first axis X toward the inward side of the handlebar 112 from a second operation start position HP2 to a fourth position P4, a fifth position P5, and a sixth position P6. The fourth position P4 and fifth position P5 are located between the second operation start position HP2 and the sixth position P6. The first and second operating members 32 and 34 are trigger action operating members that are configured to return to the first and second operation start positions HP1 and HP2 when released after finishing a shifting operation. Although in this embodiment the first and second members 32 and 34 are arranged to pivot about the same axis, i.e., the first axis X, it is also acceptable for the two operating members 32 and 34 to pivot about different axes. In such a case, the two pivot axes do not have to be parallel. It is also acceptable for the first and second operating members 32 and 34 to be arranged to move linearly instead of pivoting about an axis.

The first operating member 32 is supported on the support shaft 62 in such a manner that it can pivot freely about the first axis X. As shown in FIG. 4, the first operating member 32 has a brake lever 66, a first lever member 67, and a second lever member 68. The brake lever 66 is configured to operate a cable operated brake. The first lever member 67 pivots integrally with the brake lever 66. The second lever member 68 is connected such that it can pivot integrally with the first lever member 67. The brake lever 66 has a circular rotary support section 66a and a lever section 66b. The circular rotary support section 66a is pivotally supported on the support shaft 62. The lever section 66b is configured to extend radially outwardly from the rotary support section 66a. The rotary support section 66a is provided with a support hole 66e configured for the support shaft 62 to pass through. The lever section 66b is curved in an S-shaped fashion in the manner of a typical brake lever. A nut recess 66c is provided in the frontward surface of the rotary support section 66a for housing a fastening nut 55. The rearward surface of the rotary support section 66a includes connecting protrusions 66d (FIG. 2) for connecting to the first lever member 67. Each of the connecting protrusions 66d is a circular arc-shaped protrusion that is spaced radially apart from the support hole 66e and arranged such that its center of curvature coincides with the center of the support hole 66e. The connecting protrusions 66d serve to transfer pivot movement of the brake lever 66 to the first lever member 67.

The first lever member 67 is arranged to be in contact with (touching) the brake lever 66. The first lever member 67 is made of a metal plate-like material. The first lever member 67 has a rotary support section 67a and a connecting arm 67b. The rotary support section 67a rotatably supports the support shaft 62. The connecting arm 67b extends radially from the rotary support section 67a and bends rearward at an intermediate portion thereof. The rotary support section 67a is provided with a support hole 67c configured for the support shaft 62 to pass through. The rearward side of the rotary support section 67a is provided with a pair of rearwardly extending engagement pins 67d on radially outward positions of the rearward side of the rotary support section 67a. The engagement pins 67d are provided for connecting the first signal generator 36. The rotary support section 67a is provided with a pair of connecting holes 67e at positions located radially outward from the support hole 67c. The connecting holes 67e are configured and arranged to engage with the connecting protrusions 66d of the brake lever 66. Each of the connecting holes 67e is a generally oval hole that is spaced radially apart from the support hole 67c and curved in a circular arc shape whose center of curvature coincides with the center of the support hole 67c. The engagement of the connecting holes 67e with the connecting protrusions 66d causes the first lever member 67 to pivot about the first axis X integrally with (together with) the brake lever 66. The connecting arm 67b is provided for connecting the first lever member 67 to the second lever member 68 in an integral (fixed) fashion. The tip end of the connecting arm 67b is bent so as to be flush with the second lever member 68. A connecting bolt 74 installed through the tip end of the connecting arm 67b serves to connect the first lever member 67 and the second lever member 68 together in such a fashion that said members 67 and 68 can pivot together as a single integral unit.

The second lever member 68 is arranged to face toward the first lever member 67 with the first and second signal generators 36 and 38 disposed therebetween. The second lever member 68 is made of a metal plate-like material. The second lever member 68 has a rotary support section 68a and a connecting section 68b. The rotary support section 68a is rotatably supported on the support shaft 62 through a flanged bush 71 made of, for example, a synthetic resin. The connecting section 68b is configured to extend radially from the rotary support section 68a. The rotary support section 68a is provided with a support hole 68c configured for the support shaft 62 to pass through. An upper portion of the outer periphery of the rotary support section 68a is provided with a pair of restricting protrusions 68d and 68e configured to protrude radially outward from the upper portion of the outer periphery of the rotary support section 68a. The restricting protrusions 68d and 68e serve to restrict the pivot range of the first operating member 32 by contacting the connecting shaft 65a. The left and right side portions of the outer periphery of the rotary support section 68a are each provided with an engagement recess 68f. The engagement recesses 68f are configured to engage with engagement pins 69f (discussed later) provided on the second operating member 34. The engagement recesses 68f are circular arc shaped and serve both to restrict the pivot range of the second operating member 34 with respect to the first operating member 32 and to cause the second operating member 34 to pivot in a coordinated manner when the first operating member 32 pivots from the first operation start position HP1 toward the first position P1. The rotary support section 68a is provided with a pair of connecting holes 68j for connecting to the second signal generator 38. The frontward side of the connecting section 68b is provided with a pair of protruding mounting pins 68h and 68i for mounting the second position indicating mechanism 42. A threaded hole 68k is provided in a lower portion of the connecting section 68b for the connecting bolt 74 to screw into. Each of the connecting holes 68j is a generally oval hole that is spaced radially apart from the support hole 68c and curved in a circular arc shape whose center of curvature coincides with the center of the support hole 68c. The mounting pins 68h and 68i are parallel to each other and arranged to extend frontward.

The second operating member 34 is arranged in a position rearward of the second lever member 68 and supported on the support shaft 62 in such a manner that it can pivot freely about the first axis X. The second operating member 34 has a lever body 69 that is made of a metal plate-like material and supported on the support shaft 62 in such a manner that it can pivot freely and an operating body 70 that is made of, for example, a synthetic resin material and joined integrally with the lever body 69. The lever body 69 has a rotary support section 69a and a connecting section 69b. The rotary support section 69a is rotatably supported on the support shaft 62 through a flanged bush 72 made of, for example, a synthetic resin. The connecting section 69b is configured to extend radially outward from the rotary support section 69a toward the operating body 70. A support hole 69c is provided in the rotary support section 69a for the flanged bush 72 to be installed therein. An upper portion of the outer periphery of the rotary support section 69a has a pair of restricting protrusions 69d and 69e. The restricting protrusions 69d and 69e protrude radially outward from the upper portion of the outer periphery of the rotary support section 69a. The restricting protrusions 69d and 69e serve to restrict the pivot range of the second operating member 34 by contacting the connecting shaft 65a.

The frontward side of the rotary support section 69a has a pair of frontwardly extending engagement pins 69f provided on radially outward portions of the frontward side of the rotary support section 69a. The engagement pins 69f are provided for connecting the second signal generator 38. As described previously, the engagement pins 69f are provided both for regulating the pivot range of the second operating member 34 by engaging with the engagement recesses 68f and for coordinating the movement of the second operating member 34 with the movement of the first operating member 32. More specifically, when the second operating member 34 is operated such that it pivots from the second operation start position HP2 shown in diagram (a) of FIG. 8 toward the sixth position P6 shown in diagram (b) of FIG. 8, the engagement pins 69f move along the engagement recesses 68f. In other words, the second operating member 34 pivots with respect to the first operating member 32.

Figure 8:
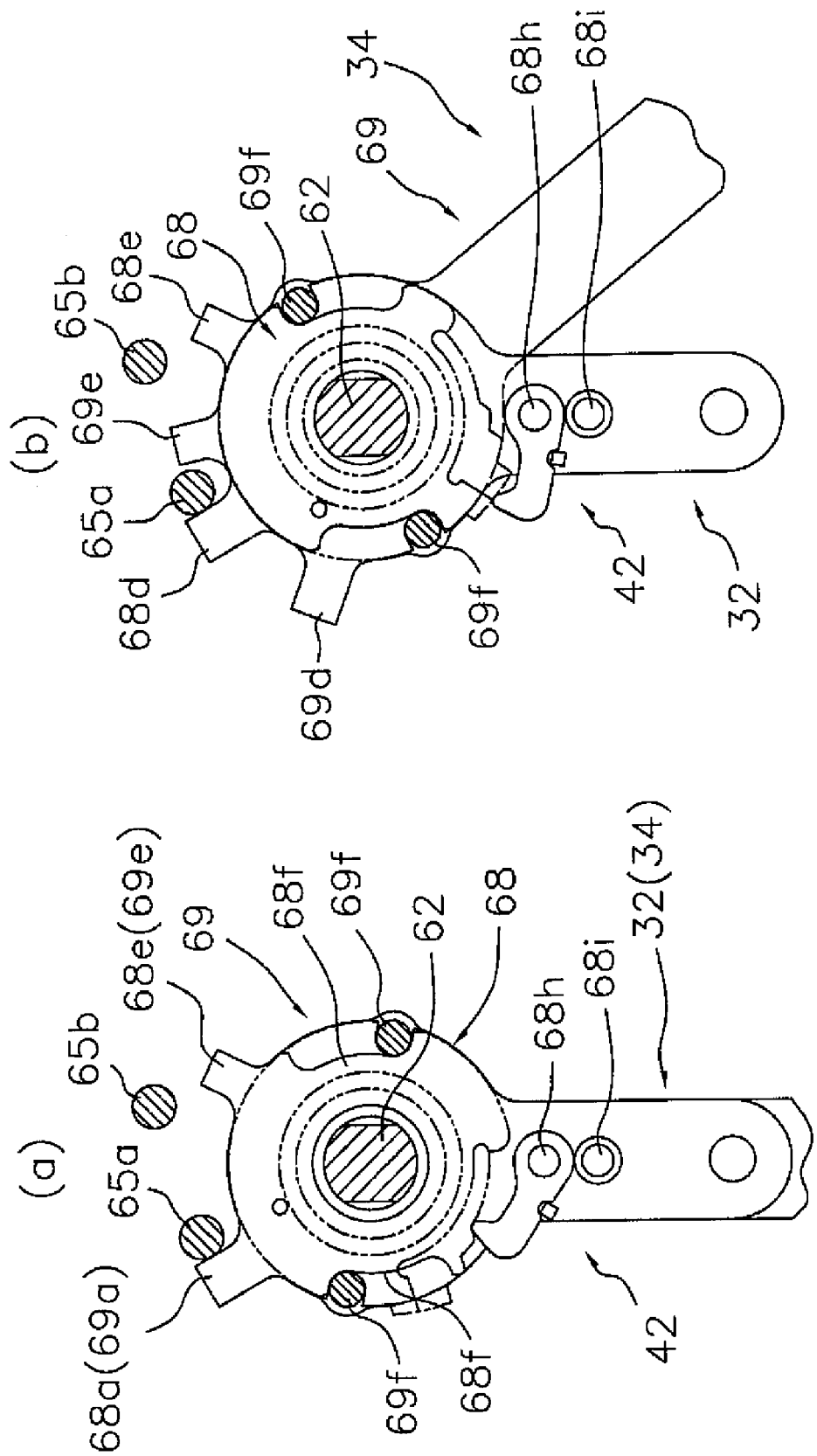
FIG. 8 is a pair of schematic views illustrating the operation of the second operating member.

Meanwhile, when the first operating member 32 is operated such that it pivots from the first operation start position HP1 toward the first position P1, the engagement recesses 68f press against the engagement pins 69f as shown in diagram (a) of FIG. 8 and the second operating member 34 pivots together with the first operating member 32.

The operating body 70 is arranged on the rearward side of the tip end portion of the brake lever 66 in such a position that it can be operated with the index finger of the hand used to operate the brake lever 66. The shape of the operating body 70 is generally the same as the shape of the release lever provided on the kind of mechanical shifter/brake levers (brake levers provided with a gear shifting function) typically used on road bikes.

A spring member 73 is provided between the second operating member 34 and the support body 60 to spring load the second operating member 34 in the direction of returning to the second operation start position HP2. A spiral spring, for example, is used as the spring member 73 in order to reduce the axial dimension thereof. One end (outside end in this embodiment) of the spring member 73 is hooked onto the support body 60 and the other end (inside end in this embodiment) is hooked onto the rotary support part 69a of the lever body 69. The spring member 73 spring loads the second operating member 34 in the clockwise direction of FIG. 3, i.e., toward the outside of the handlebar 112. When the second operating member 34 turns (pivots) clockwise, the first operating member 32 turns, too, due to the engagement of the engagement pins 69f with the engagement recesses 68f. Consequently, the first operating member 32 can be returned to the first operation start position HP1 with using the same spring member 73 (i.e., both operating members 32 and 34 can be returned with one spring member 73). The spring force of the spring member 73 is set to be stronger than the pressing forces of the first and second position indicating mechanisms 40 and 42 (described later).

The first signal generator 36 and the second signal generator 38 are basically mirror images of each other except for portions thereof. Therefore, the following explanation will focus chiefly on the first signal generator 36 and only the portions of the second signal generator 38 that are different will be explained.

The first signal generator 36 is configured to generate a signal for changing the shift position of the rear derailleur 97r by one position in a first direction (e.g., the downshift direction) from the current shift position when the first operating member 32 is moved from the first operation start position HP1 to the first position P1, and to generate a signal for changing the shift position of the rear derailleur 97r by two positions from the current shift position when the first operating member 32 is moved from the first operation start position HP1 past the first position P1 to the second position P2. The first signal generator 36 is further configured to generate a signal for changing the shift position of the rear derailleur 97r by three positions from the current shift position when the first operating member 32 is moved from the first operation start position HP1 past the first position P1 and second position P2 to a third position P3.

The second signal generator 38 is configured to generate a signal for changing the shift position of the rear derailleur 97r by one position in a second direction (e.g., the upshift direction) from the current shift position when the second operating member 34 is moved from the second operation start position HP2 to the fourth position P4, and to generate a signal for changing the shift position of the rear derailleur 97r by two positions from the current shift position when the second operating member 38 is moved from the second operation start position HP2 past the fourth position P4 to the fifth position P5. The second signal generator 38 is further configured to generate a signal for changing the shift position of the rear derailleur 97r by three positions from the current shift position when the second operating member 38 is moved from the second operation start position HP2 past the fourth position P4 and fifth position P5 to a sixth position P6.

Figure 5:
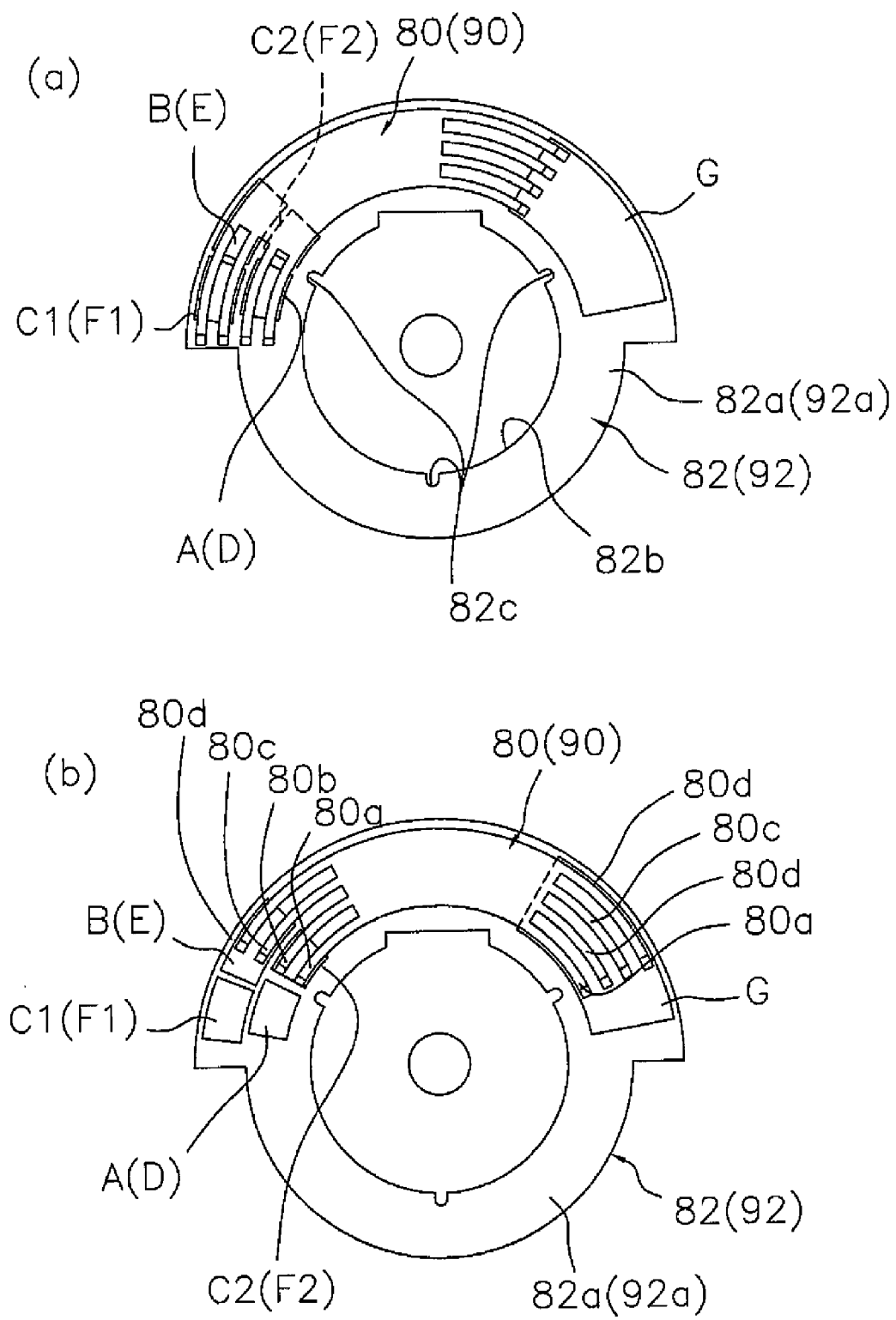
FIG. 5 is a pair of schematic views illustrating how the first and second signal generators operate.

As shown in FIGS. 4 and 5, the first signal generator 36 has a first movable contact 80 that is connected to the first operating member 32 and moves in accordance with the pivot motion of the first operating member 32 and a first stationary contact 82 that is connected non-rotatably to the mounting part 30 and configured to contact with and separate from the first movable contact 80.

As shown in FIG. 4, the first stationary contact 82 is connected to a first stationary member 83 that is mounted non-rotatably to the support shaft 62. The first stationary member 83 has a flange section 83a and a cylindrical section 83b and is made of an insulating material, e.g., a synthetic resin. The first stationary member 83 also has an oval hole 83c configured to engage non-rotatably with the rotation preventing section 62d of the support shaft 62. The frontward surface of the flange section 83a of the first stationary member 83 is provided with a pair of connecting protrusions 83d. The connecting protrusions 83d engage the connecting holes 64b of the front frame 64 is. The first stationary contact 82 is connected non-rotatably to the cylindrical section 83b at the portion where the cylindrical section 83b borders with the flange section 83a.

As shown in diagrams (a) and (b) of FIG. 5, the first stationary contact 82 has a mounting section 82a, a first pattern C1 and a second pattern A, a third pattern B, fourth pattern C2 and a common pattern G. The mounting section 82a is non-rotatably connected to the first stationary member 83. The first pattern C1 is formed on a frontward surface of the mounting section 82a. The second pattern A is arranged so as to be spaced apart from the first pattern C1 along a direction that intersects with the movement direction of the first movable contact 80 (inward direction from the first pattern C1) and offset with respect to the first pattern C1 along the movement direction. The third pattern B is arranged so as to be spaced apart from the first pattern C1 in the movement direction. The fourth pattern C2 is arranged so as to be spaced apart from the second pattern A along the movement direction and offset with respect to the second pattern B in the movement direction. The common pattern G is arranged to be spaced apart from the patterns A, B, C1 and C2 in the movement direction. The second pattern A is arranged between the first pattern C1 and the third pattern B along the movement direction and overlaps the patterns C1 and B in the movement direction. In this embodiment, the first pattern C1 and the fourth pattern C2 are electrically connected in order to reduce the number of signal lines. Therefore, the signal generated at these two patterns C1 and C2 is indicated as "signal C" in the subsequent explanation using a timing chart. The mounting section 82a is a circular disk-shaped member made of an insulating material, e.g., a synthetic resin. The mounting section 82a is configured such that a semicircular arc-shaped portion of the outer circumference thereof where the patterns are not formed has been cut away (removed). Meanwhile, the radially inwardly facing surface of the mounting section 82a constitutes a through hole 82b configured such that the cylindrical section 83b of the first stationary member 83 can pass therethrough. The through hole 82b is provided with three recesses 82c configured to engage with three protrusions (not shown) of the cylindrical section 83b of the first stationary member 83. The engagement of the recesses 82c and the protrusions causes the first stationary contact 82 to be connected non-rotatably to the first stationary member 83.

The first movable contact 80 is made of a thin sheet metal material that is electrically conductive and shaped like a circular arc. The first movable contact 80 has an elastic quality and both ends thereof are bent toward the patterns A, B, C1 and C2 and the pattern G of the first stationary contact 82. The length of the first movable contact 80 is such that when the first operating member 32 is arranged in the first operation start position, one end of the first movable contact 80 is separated from the first pattern C1 and the other end contacts or slightly contacts the common pattern (in this embodiment, the contact is slight). Each of the ends of the first movable contact 80 is divided into four contact pieces 80a to 80d arranged from the radially inward side to the radially outward side, respectively. Two of the contact pieces 80a and 80b are arranged to contact the radially inwardly located contacts A and C2 and the other two contact pieces 80c and 80d are arranged to contact the radially outwardly located contacts C1 and B. As a result, the signals for changing the shift position of the derailleur can be turned on and off successfully even if one of the contact pieces has poor contact with the pattern so long as the other contact piece is contacting the pattern.

As shown in FIG. 4, the first movable contact 80 is fixed to a first movable member 84 that is made of an insulating material, e.g., a synthetic resin, and is mounted to the first stationary member 83 in a freely rotatable manner. The first movable member 84 has a main body part 84a and a lid member 84b. The main body part 84a is provided with a space configured to enclose the first stationary contact 82 and the first movable contact 80. The lid member 84b is configured to cover the space of the main body part 84. The first stationary contact 82 is connected to the first stationary member 83 while also being enclosed inside the space. The first movable contact 80 is fixed to the main body part 84a inside the space. The main body part 84a is provided with an O-ring 85 for sealing one side of the space of the main body part 84. The lid member 84b is provided with an O-ring 86 for sealing the other side of the space of the main body part 84. The O-ring 85 is arranged on one end of the first movable member 84 with the front end contacting the flange section 83a of the first stationary member 83. The O-ring 86 is arranged on the other end of the first movable member 84 with the rear end contacting one of two synthetic resin washer members 98 that is arranged between the first movable body 84 and the second signal generator 38. As a result, the first movable contact 80 and the first stationary contact 82 are protected from the intrusion of liquids, which could cause corrosion and degradation of the contact quality.

Figure 7:
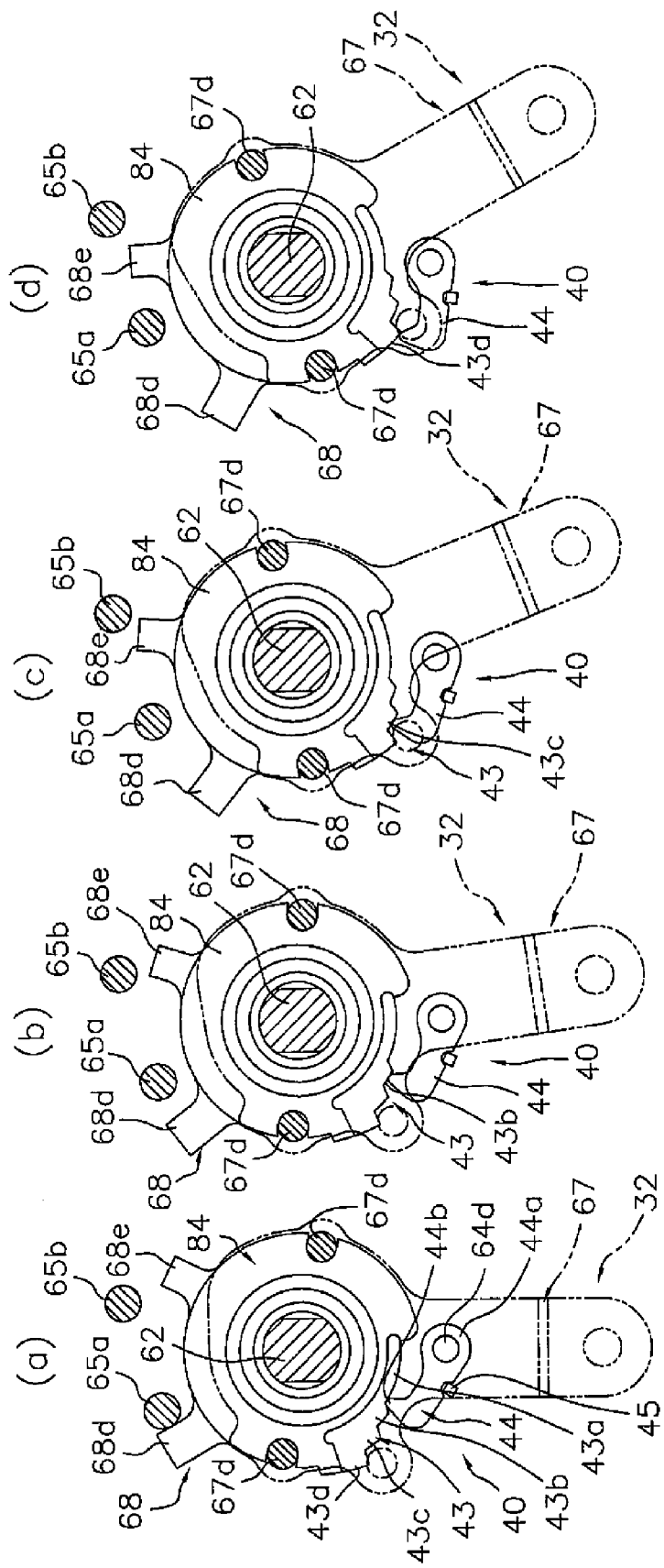
FIG. 7 is a series of schematic views illustrating the operation of the first operating member.

The external circumference of the main body part 84a is provided with a pair of engagement grooves 84d. The engagement grooves 84d are configured to engage with the pins 67d provided on the first lever member 67. The engagement of the engagement pins 67d with the engagement grooves 84d causes the pivot motion of the first operating member 32 to be conveyed to the first movable member 84, thus causing the first movable contact 80 to turn. A first indicating tooth 43 constituting part of the first position indicating mechanism 40 is formed on the external circumferential surface of the main body part 84. The first indicating tooth 43 has a three-stepped shape as shown in FIG. 7.

The second signal generator 38 has substantially the same structure as the first signal generator 36 except that it is a mirror image of the first signal generator 36. The parts of the second signal generator 38 are indicated with reference numerals in the 90's instead of the reference numerals in the 80's used for the first signal generator 36. As shown in FIG. 4, the second signal generator 38 has a second movable contact 90 that is connected to the second operating member 34 and moves in accordance with the pivot motion of the second operating member 34 and a second stationary contact 92 that is connected non-rotatably to the second lever member 68 and configured to contact with and separate from the second movable contact 90.

The second stationary contact 92 is connected non-rotatably to the second stationary member 93, and the second movable contact 90 is fixed to the second movable member 94. The second signal generator 38 is different from the first signal generator 36 in that the internal circumferential surface of the second stationary member 93 constitutes a support hole 93c configured to be supported in a freely rotatable manner on the support shaft 62 and that the second stationary member 93 is connected non-rotatably to the first operating member 32, i.e., the second lever member 68, instead of the mounting part 30. These differences exist because the brake/derailleur operating unit is contrived such that the second operating member 34 pivots when the first operating member 32 is operated and it is necessary to prevent the second signal generator 38 from generating a signal for changing the shift position in the second direction when the second operating member 34 pivots as a result of the first operating member 32 being pivoted. The first pattern F1, the second pattern D, the third pattern E, the fourth pattern F2, and the common pattern G are also configured as mirror images of the patterns of the first signal generator 36 and formed on the rearward surface of the mounting part 92a. All other parts are also in a mirror image relationship with the parts of the first signal generator 36 and, thus, explanations thereof are omitted here.

With a first signal generator 36 (or second signal generator 38) configured as described heretofore, when the first operating member 32 (or second operating member 34) is arranged at the first operation start position HP1 (or second operation start position HP2), one end of the first movable contact 80 (or the second movable contact 90) does not contact the first pattern C1 (or F1) and the other end contacts the common contact G, as shown in FIG. 5. As the first operating member 32 (or second operating member 34) is pivoted from the first operation start position HP1 (or second operation start position HP2) toward the third position P3 (or sixth position P6), said one end of the first movable contact 80 (or second movable contact 90) successively contacts with and separates from the first to third patterns C1, A, and B (or F1, D, and B). When the first operating member 32 (or second operating member 34) reaches the third position P3 (or sixth position P6), said one end of the first movable contact 80 (or second movable contact 90) contacts the fourth pattern C2 (or F2).

Figure 6:
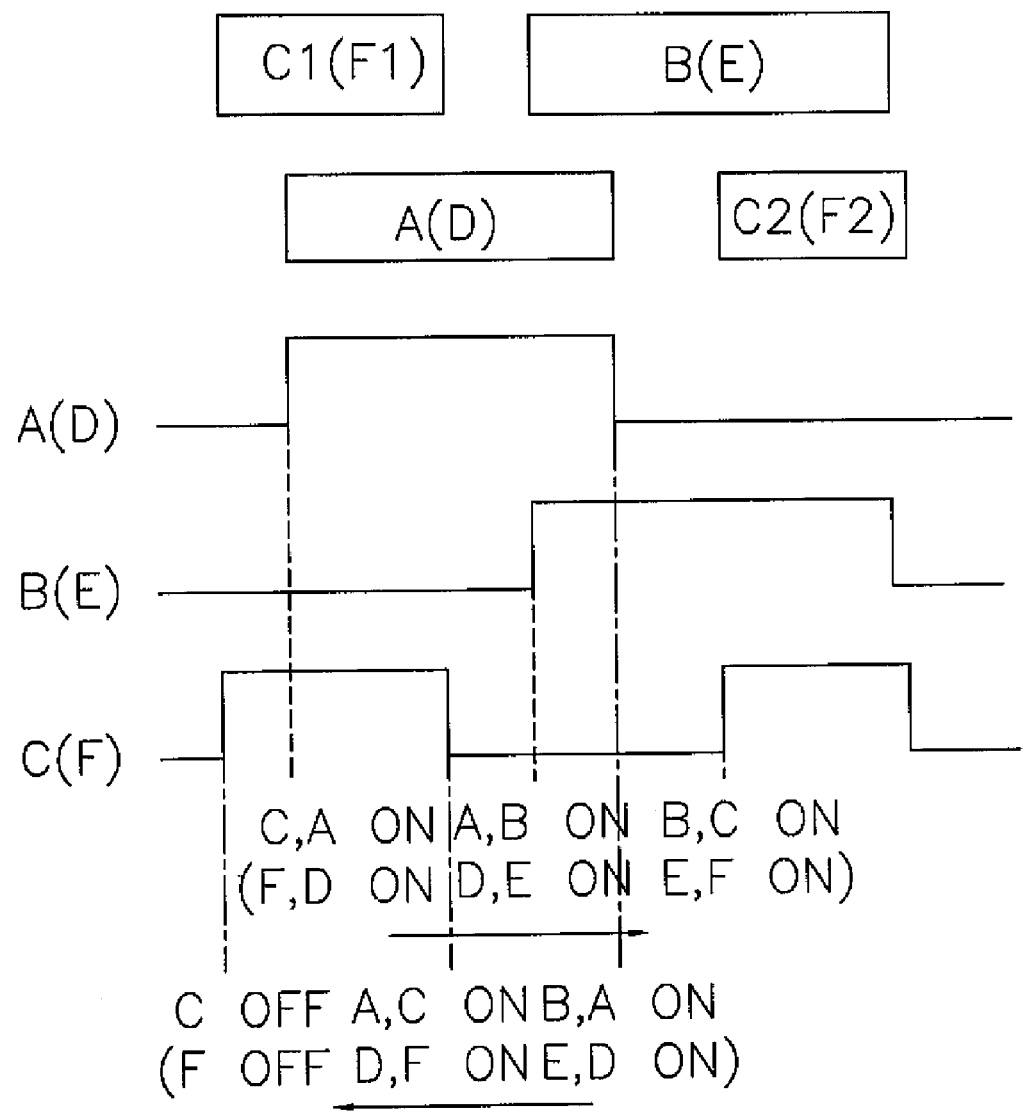
FIG. 6 is a timing chart for the signals generated by the first and second signal generators.

FIG. 6 is a timing chart illustrating the signal generation. In FIG. 6, when the first operating member 32 starts to pivot from the first operation start position HP1 (or the second operation start position HP2), the first movable contact 80 (or second movable contact 90) first contacts the first contact C1 (or F1) and turns the signal C (or F) on. Then, as the first operating member 32 (or second operating member 34) pivots, the first movable contact 80 (or second movable contact 90) contacts the second to fourth patterns A, B, and C2 (or D, E, and F2) in order as listed, thus successively turning on the signals A, B, and C. The signal C turns off temporarily while the signal A is on before the B signal turns on and turns back on after the signal B turns on and the signal A turns off.

Thus, signals for indexing by one, two, or three positions are achieved with the two on and off states, the on-edge states (place where signal turns from off to on), and the off-edge states (place where signal turns from on to off) of the signals. More specifically, in this embodiment, when the first operating member 32 (or second operating member 34) is operated from the first operation start position HP1 (or second operation start position HP2) and the signal A (or signal D) reaches the on-edge state while the signal C (or signal F) is on, a rear control unit 127r (FIG. 9) to be described later determines that the signal for indexing the rear derailleur 97f one position in the first direction (or second direction) is on. Similarly, the rear control unit 127r determines that the signal for shifting by two positions has turned on when the signal B (or signal E) reaches the on-edge state while the signal A (or signal D) is on and that the signal for shifting by three positions has turned on when signal C (or signal F) reaches the on-edge state while the signal B (or signal E) has turned on.

When the first operating member 32 (or second operating member 34) is returning to the first operation start position HP1 (or second operation start position HP2) and the signal A (or signal D) reaches the on-edge state while the signal B (or signal E) is on, the rear control unit 127r determines that the signal for shifting the rear derailleur 97f by three positions in the first direction (or second direction) has turned off. Similarly, the rear control unit 127r determines that the signal for shifting by two positions has turned off when the signal C (or signal F) reaches the on-edge state while the signal A (or signal D) is on and that the signal for shifting by one position has turned off when signal C (or signal F) reaches the off-edge state while only the signal C is on.

With this embodiment, it is difficult for vibration of the first operating member 32 to cause unintended gear shifting because the positions where the signals for changing the shift position turn on and off are offset from one another by using a plurality of patterns that are separated from one another in the movement direction and in a direction intersecting the movement direction.

The first position indicating mechanism 40 and the second position indicating mechanism 42 are configured to be mirror images of each other. Therefore, the following explanation will focus chiefly on the first position indicating mechanism 40.

The first position indicating mechanism 40 is configured to issue a first indication when the first operating member 32 is between the first operation start position HP1 and the first position P1, a second indication when the first operating member 32 is between the first position P1 and the second position P2, and a third indication when the first operating member 32 is between the second position P2 and the third position P3.

As shown in FIG. 4 and FIG. 7, the first position indicating mechanism 40 has the aforementioned first indicating tooth 43, a first indicating pawl 44 pivotally attached to the mounting pin 64d in such a fashion that it contacts the first indicating tooth 43, and a first force applying member 45 configured to force the first indicating pawl 44 toward the first indicating tooth 43. The first indicating tooth 43 is made of metal and formed as a single unitary member by, for example, insert molding. As shown in FIG. 7, the first indicating tooth 43 has a first section 43a that is the most recessed and second to fourth sections 43b to 43d that are positioned progressively further outward in the radial direction in a step-like fashion. The first indicating pawl 44 is a member made of, for example, a metal material. The first indicating pawl 44 includes a pivotal mounting section 44a configured to be mounted on the mounting pin 64d in a pivotal manner and a claw-like section 44b that extends radially outward from the pivotal mounting section 44a and then protrudes toward the first indicating tooth 43. The first force applying member 45 is a torsional coil spring having one end latched onto the mounting pin 64e and the other end latched onto the back side of the first indicating pawl 44.

With this first position indicating mechanism 40, as shown in diagram (a) of FIG. 7, the claw-like section 44b of the first indicating pawl 44 contacts the border between the first section 43a and the second section 43b when the first operating member 32 is arranged in the first operation start position HP1 under the spring load of the spring member 73. When the first operating member 32 is pivoted toward the first position P1 against the spring loading force of the spring member 73, the claw-like section 44b is pressed by the second section 43b and the first indicating pawl 44 rocks counterclockwise (counterclockwise from the perspective of FIG. 7). As shown in diagram (b) of FIG. 7, the claw-like section 44b rides up onto the second section 43b and the signal for shifting by one position is generated when the claw-like section 44b is at an intermediate position along the second section 43b. When the claw-like section 44b reaches the step-like portion between the second section 43b and the third section 43c, the resistance to operation of the first operating member 32 becomes stronger. When the claw-like section 44b lifts onto the second section 43b, the rider experiences a feeling that the first operating member 32 has clicked into place and a slight sound is emitted as the first report. In this way, the rider can be notified that the first operating member 32 has been moved to the first position P1. Similarly, when the first operating member 32 is moved to the second position P2, the claw-like section 44b is pressed by the third section 43c and the first indicating pawl 44 rocks counterclockwise (counterclockwise from the perspective of FIG. 7). Then, as shown in diagram (c) of FIG. 7, the claw-like section 44b rides up onto the third section 43c and the signal for shifting by two positions is generated when the claw-like section 44b is at an intermediate position along the third section 43c. Likewise, when the first operating member 32 is moved to the third position P3, the claw-like section 44b is pressed by the fourth section 43d and the first indicating pawl 44 rocks counterclockwise such that, as shown in diagram (d) of FIG. 7, the claw-like section 44b rides up onto the fourth section 43d. The signal for shifting by three positions is generated when the claw-like section 44b has moved only slightly along the fourth section 43d. When the first operating member 32 is moved to the second position P2, the resistance to operation of the first operating member 32 becomes stronger at the step-like portion between the third section 43c and the fourth section 43d. When the first operating member 32 is moved to the third position P3, the restricting protrusion 68e contacts the connecting shaft 65a and stops the movement. When the claw-like section 44b lifts onto the third and fourth sections 43c and 43d, the user experiences a feeling that the first operating member 32 has clicked into place and a slight sound is emitted as the second or third indication, respectively. In this way, the rider can be notified that the first operating member 32 has been moved to the second or third position P2 or P3.

When the first operating member 32 returns to the first operation start position HP1, each signal turns off as the first indicating pawl 44 descends each step of the first indicating tooth 43.

Since the diameter becomes larger as one moves from the first section 43a to the fourth section 43d, the spring force of the first force applying member 45 increases as the first indicating pawl 44 ascends each step and the operating force required to operate the first operating member 32 gradually increases. As a result, the operating force required to shift across multiple shift positions is larger than the operating force required to shift to an adjacent shift position and, thus, erroneous operation of the gear shifter can be prevented.

The first movable contact 80 and the patterns C1, A, B, and C2 of the first stationary contact 82 are configured and arranged such that the signals turn on and off at the positions described above.

The second position indicating mechanism 42 has a second indicating tooth 46, a second indicating pawl 47, and a second force applying member 48. As shown in FIG. 4, these parts are arranged in a mirror image relationship with respect to the parts of the first position indicating mechanism 40.

Since the front sprocket cluster 99f has only two sprockets, the brake/derailleur operating unit 110b for operating the front derailleur 97f is configured such that the first operating member 49 (or second operating member 51) pivots toward the inward side of the handlebar 112 from a first operation start position HP3 (or a second operation start position HP4) to a first position P7 (or a fourth position P8) only. Consequently, the first and second stationary contacts of the brake/derailleur operating unit 110b only need to have a first pattern and a second pattern. If the front sprocket cluster has three sprockets, the brake/derailleur operating unit 110b for operating the front derailleur 97f can be configured to shift the shift position of the front derailleur 97f by two shift positions with a single operation by providing a second position (fifth position) to which it can pivot. The brake/derailleur operating unit 110b, too, is provided with a front shift position display device 119f (FIG. 9).

The brake/derailleur operating units 110a and 110b are connected to the rear derailleur 97r and the front derailleur 97f, respectively, with electrical wiring.

Figure 9:
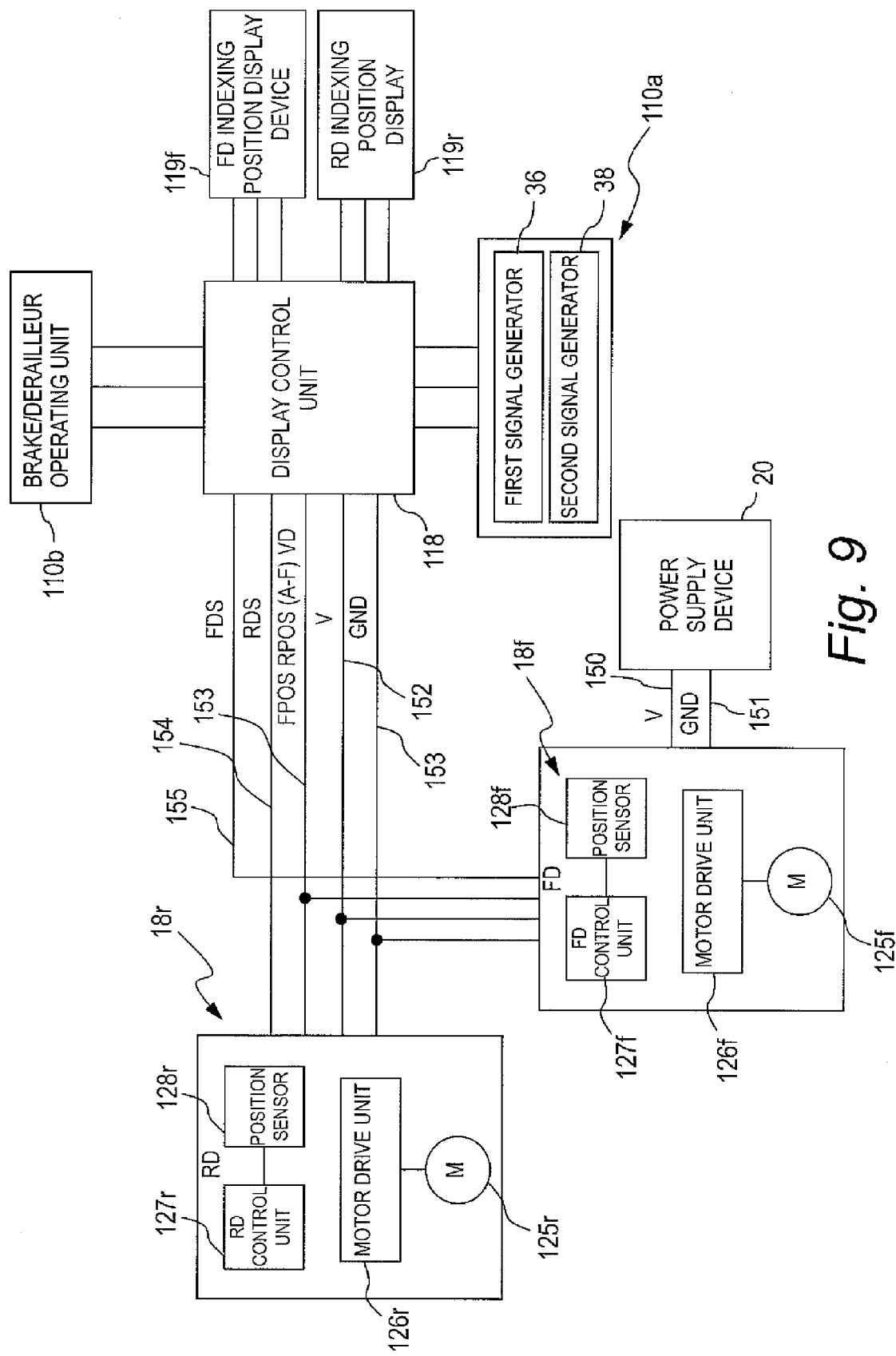
FIG. 9 is a block diagram illustrating selected components of the gear shifting control system.

As shown in FIG. 9, the electric drive unit 18f of the front derailleur 97f includes a motor 125f for driving the front derailleur 97f, a motor drive unit 126f for driving the motor 125f, a front control unit 127 (FD control unit) configured to control the motor drive unit 126f based on the signal from the brake/derailleur operating unit 110b, and a position sensor 128f for detecting the shift position of the front derailleur 97f.

Similarly, the electric drive unit 18*r* of the rear derailleur 97*r* includes a motor 125*r*, a motor drive unit 126*r* for driving the motor 125*r*, a rear control unit 127 (RD control unit), and a position sensor 128*r* for detecting the shift position of the rear derailleur 97*r*.

Each of the front and rear motor drive units 126*f* and 126*r* has a motor driver and a reduction unit configured to reduce the rotational speed of the respective motor 125*f* or 125*r*. Each of the front and rear control units 127*f* and 127*r* has a control circuit that includes a microcomputer having a memory unit and a processing unit and each is configured to use software to control the respective motor drive unit 126*f* or 126*r*, respectively, based on the signal outputted from the respective brake/derailleur operating unit 110*a* or 110*b*. The front and rear position sensors 128*f* and 128*r* are configured to use, for example, a rotary encoder to detect the shift position of the respective derailleur 97*f* or 97*r*.

The power supply device 20 mounted to the front derailleur 97*f* delivers electric power to the derailleurs 97*f* and 97*r*, the brake/derailleur operating units 110*a* and 110, the display control unit 118, and the front and rear shift position display devices 119*f* and 119*r*. More specifically, direct current power supply voltage V of 6 to 8.4 volts is supplied from the power supply device 20 to the electric drive unit 18*f* of the front derailleur 97*f* through a power supply line 150 and a ground line 151. In turn, the power supply voltage V is supplied from the electric drive unit 18*f* to the display control unit 118 and the electric power unit 18*r* of the rear derailleur 97*r* through a power supply line 152 and a ground line 153.

The power supply voltage V is supplied to the shift position display devices 119*f* and 119*r* and the front and rear derailleur operating units 110*a* and 110*b* through the display control unit 118. The shift position signals FPOS and RPOS of the front and rear position sensor 128*f* and 128*r* are fed to the display control unit 118 through a position signal line 154. The display control unit 118 converts the shift position signals into display signals and displays the shift positions of the front and rear derailleurs 97*f* and 97*r* on the front and rear shift position display devices 119*f* and 119*r*. The shift signals FDS and RDS (signals A to F) issued in response to operation of the brake/derailleur operating units 110*a* and 110*b* pass through the display control unit 118 and are fed to the front and rear derailleurs 97*f* and 97*r* through shift signal lines 155 and 156, respectively. The shift signal line 156 of the shift signal RDS is actually connected to the electric drive unit 18*r* through the electric drive unit 18*f*. The electric drive unit 18*f* of the front derailleur 97*f* is connected to the display control unit 118 with a five-core wire passed through, for example, the down tube 102*c*, and the electric drive unit 18*r* is connected to the electric drive unit 18*f* with a four-core wire passed through, for example, the chain stay 102*d*. Therefore, it is acceptable to provide the electric drive unit 18*f* with a connector for connecting the five wires of the five-core wire collectively.

The control processing executed by the rear control unit 127*r* will now be explained in a general manner. The control processing explained here is merely an example and the control processing of the present invention is not limited to this control processing.

Figure 10:
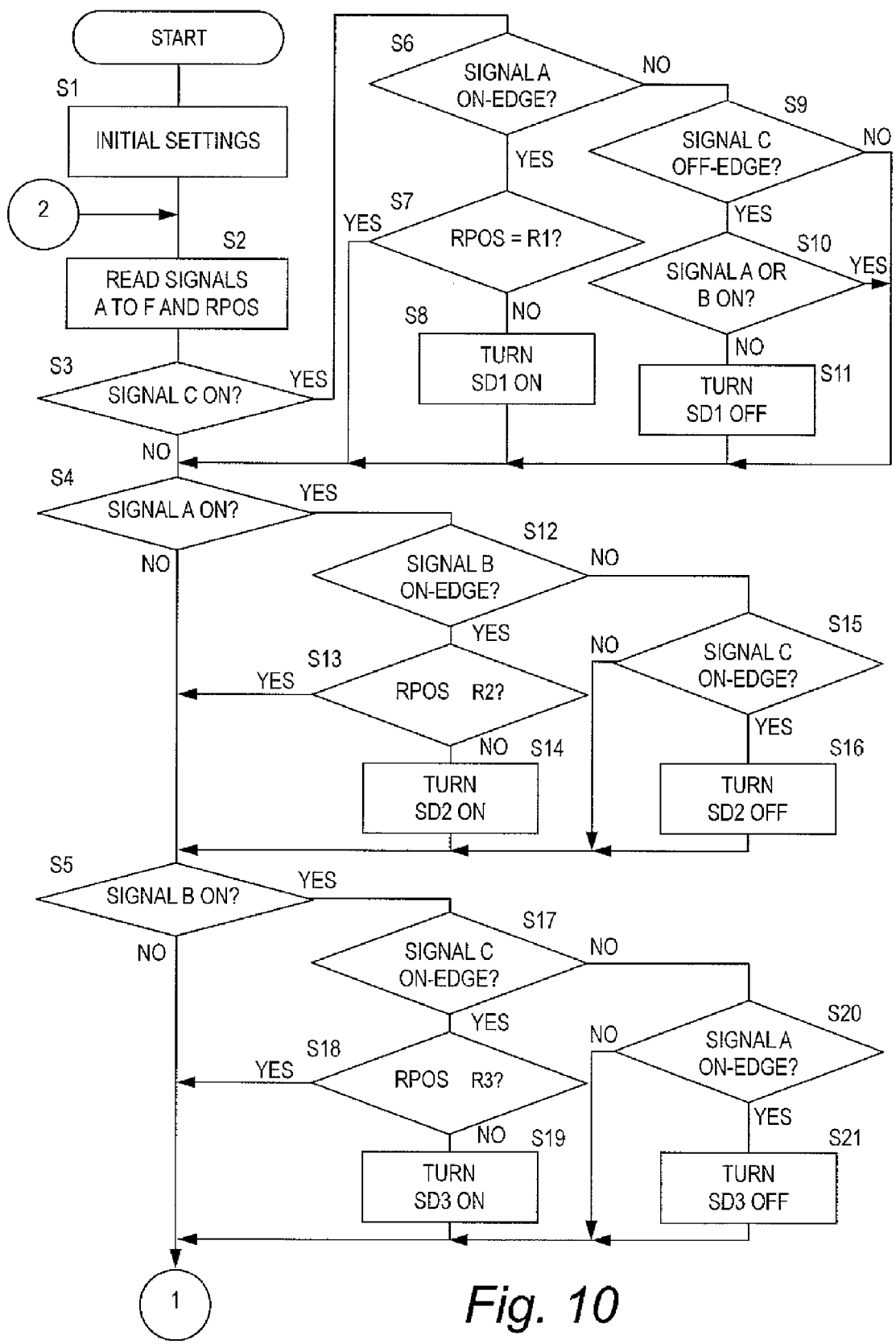
FIG. 10 is a flowchart showing the downshift control processing executed by the rear shift control unit.
Figure 11:
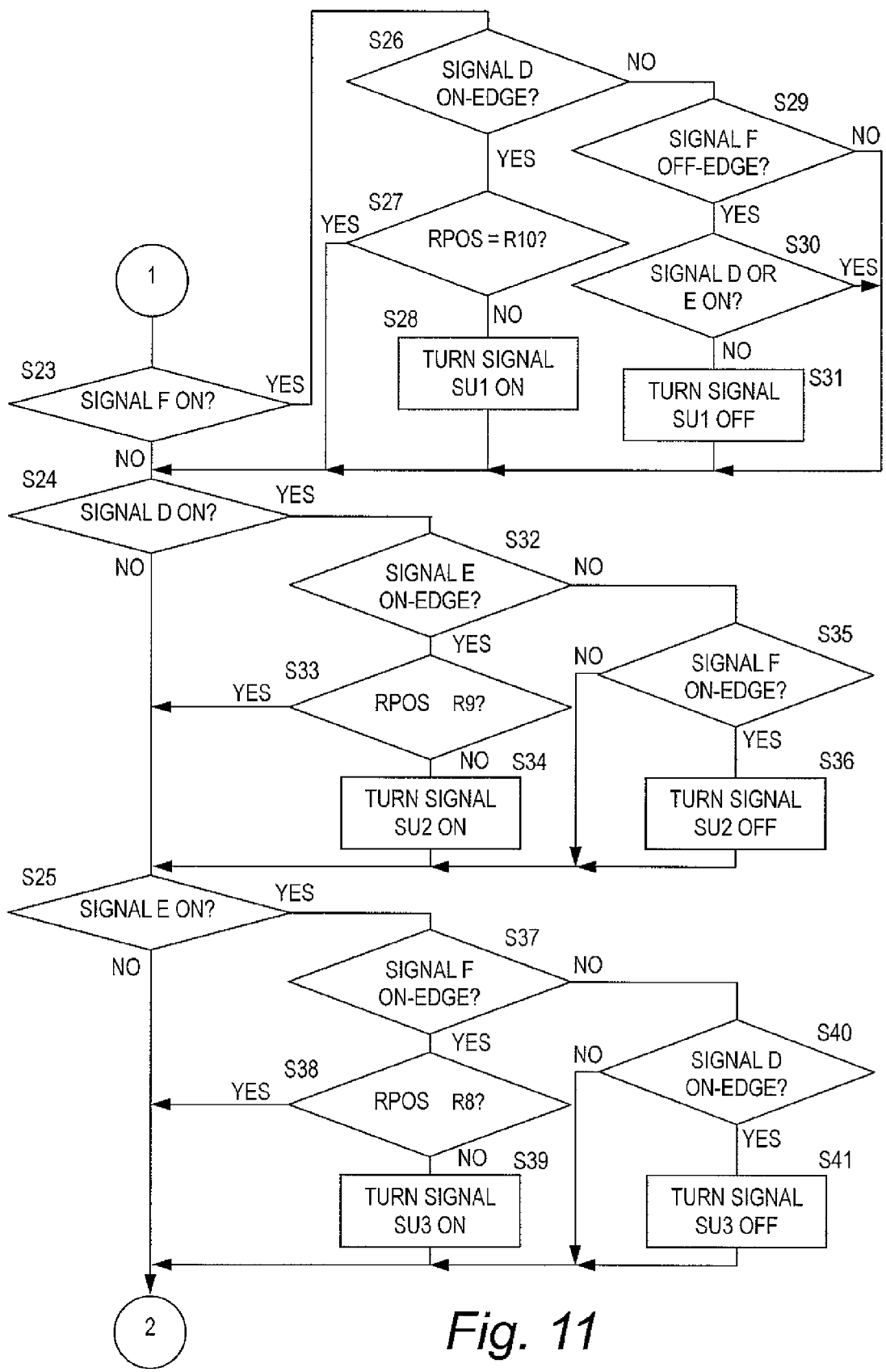
FIG. 11 is a flowchart showing the upshift control processing executed by the rear shift control unit.

As shown in FIG. 10, when the electric power is supplied, the rear control unit 127*r* proceeds to step S1 and executes initial settings. The initial settings involve initializing the various flags and variables. In step S2, the rear control unit 127*r* reads the signals A to F and the current shift position signal RPOS. In step S3, the rear control unit 127*r* determines if the signal C is on. If the signal C is not on, the rear control unit 127*r* proceeds to step S4 and determines if the signal A is on. If the signal A is not on, the rear control unit 127*r* proceeds to step S5 and determines if the signal B is on. If it determines that all three signals A to C are not on, the rear control unit 127*r* proceeds to step S23 of FIG. 11. Step 23 and the subsequent steps shown in FIG. 11 are for shifting in the second direction, i.e., the upshift direction. The upshift processing is executed in a continuous loop fashion with the downshift processing, but here the downshift processing for shifting in the first direction) will be explained first.

If it determines that the signal C is on, the rear control unit 127*r* proceeds from step S3 to step S6. In step S6, the rear control unit 127*r* determines if the signal A is in the on-edge state, i.e., if the signal A has just changed from off to on. If the signal A is in the on-edge state, the rear control unit 127*r* determines that it is time to turn on a signal SD1 for downshifting one position from the current shift position RPOS. The rear control unit 127*r* proceeds to step S7 and determines if the current shift position RPOS of the rear derailleur 97*r* is the position R1, i.e., the shift position corresponding to the innermost sprocket (i.e., the rear sprocket with the largest diameter). If the shift position RPOS is R1, the rear control unit 127*r* proceeds to step S4 because it is not possible to downshift. If the shift position RPOS is not R1, the rear control unit 127*r* proceeds to step S8, where it turns on the signal SD1 for downshifting by one position. In response, the motor drive unit 126*r* executes the downshift by moving the rear derailleur 97*r* one position in the downshift direction from the current shift position RPOS. The rear control unit 127*r* then proceeds to step S4. If it determines that the signal A is not in the on-edge state, the rear control unit 127*r* proceeds from step S6 to step S9. In step S9, the rear control unit 127*r* determines if the signal C is in the off-edge state, i.e., if the signal C has just changed from the on state to the off state. The rear control unit 127*r* proceeds to step S4 if the signal C is not in the off-edge state and to step S110 if the signal C is in the off-edge state. In step S10, the rear control unit 127*r* determines if the signal A or the signal B is on. If the signal A or the signal B is off, then the rear control unit 127*r* determines that it is time to turn off the signal SD1 for downshifting by one position and proceeds to step S11, where it turns the signal SD1 off. If the signal A or the signal B is on, then the rear control unit 127*r* proceeds to step S4.

If it determines that the signal A is on, the rear control unit 127*r* proceeds from step S4 to step S12. In step S12, the rear control unit 127*r* determines if the signal B is in the on-edge state. If the signal B is in the on-edge state, then the rear control unit 127*r* determines that it is time to turn on a signal SD2 for downshifting two positions from the current shift position RPOS. The rear control unit 127*r* proceeds to step S13 and determines if the current shift position RPOS of the rear derailleur 97*r* is the position R2, i.e., the shift position corresponding to the sprocket adjacent to the innermost sprocket (i.e., the rear sprocket with the second largest diameter) or R1. If the shift position RPOS is R2 or R1, then the rear control unit 127*r* proceeds to step S5 because it is not possible to downshift by two positions from the current shift position RPOS. If the shift position RPOS is not R2 nor R1, then the rear control unit 127*r* proceeds to step S14, where it turns on the signal SD2 for downshifting by two positions. In response, the motor drive unit 126*r* executes the downshift by moving the rear derailleur 97*r* two positions in the downshift direction from the current shift position RPOS. The rear control unit 127*r* then proceeds to step S5. Meanwhile if the signal B is not in the on-edge state, the rear control unit 127*r* proceeds from step S12 to step S15, where it determines if the signal C is in the on-edge state. If the signal C is in the on-edge state, the rear control unit 127*r* determines that the first operating member 32 has returned from the second position P2 and it is time to turn the signal SD2 off. Therefore, the rear control unit 127r proceeds to step S16 and turns the signal SD2 off. The rear control unit 127r then proceeds to step S5.

If it determines that the signal B is on, the rear control unit 127r proceeds from step S5 to step S17. In step S17, the rear control unit 127r determines if the signal C is in the on-edge state. If the signal C is in the on-edge state, the rear control unit 127r determines that it is time to turn on a signal SD3 for downshifting three positions from the current shift position RPOS. The rear control unit 127r proceeds to step S18 and determines if the current shift position RPOS of the rear derailleur 97r is the position R3, i.e., the shift position corresponding to the sprocket located two sprockets from the innermost sprocket (i.e., the rear sprocket with the third largest diameter), R2 or R1. If the shift position RPOS is R3, R2 or R1, the rear control unit 127r proceeds to step S6 because it is not possible to downshift by three shift positions. If the shift position RPOS is not either of R3, R2, R1, the rear control unit 127r proceeds to step S19, where it turns on the signal SD3 for downshifting by three positions. In response, the motor drive unit 126r executes the downshift by moving the rear derailleur 97r three positions in the downshift direction from the current shift position RPOS. The rear control unit 127r then proceeds to step S23. Meanwhile if the signal C is not in the on-edge state, the rear control unit 127r proceeds from step S17 to step S20, where it determines if the signal A is in the on-edge state. If the signal A is in the on-edge state, the rear control unit 127r determines that the first operating member 32 has returned from the third position P3 and it is time to turn the signal SD3 off. Therefore, the rear control unit 127r proceeds to step S21 and turns the signal SD3 off. The rear control unit 127r then proceeds to step S23.

The upshift processing of steps S23 to S41 is similar to the downshift processing of steps S3 to S21. However, the determination as to whether or not upshifting is possible is accomplished in steps S27, S33, and S38 by determining if the current shift position RPOS read in step S2 is at the shift position R10 corresponding to the smallest diameter sprocket, the shift position R9 corresponding to the second smallest diameter sprocket (sprocket adjacent to the smallest sprocket) or R10, or the shift position R8 corresponding to the third smallest sprocket (sprocket two sprockets away from smallest sprocket) or R9 or R10, respectively. Based on the results of the determination regarding the current shift position RPOS, the signal SU1 for upshifting by one position is turned on in step S28 or off in step S31, the signal SU2 for upshifting by two positions is turned on in step S34 or off in step S36, and the signal SU3 for upshifting by three positions is turned on in step S39 or off in step S41.

The first operating member 32 (or second operating member 34) is configured such that it can be moved from a first operation start position HP1 (or second operation start position HP2) to a first position P1 (or fourth position P4), a second position P2 (or fifth position P5) located beyond the first position P1 (or P4), and a third position P3 (or sixth position P6) located beyond the second position P2 (or P5). Since the rear derailleur 97r can be shifted in a first direction (e.g., the downshift direction) or a second direction (e.g., the upshift direction) by one, two, or three positions by moving the first operating member 32 to the first position P1 (or P4), the second position P2 (or P5), or the third position P3 (P6), respectively, the rear derailleur 97r can be made to index (shift) across a plurality of shift positions in either of the two directions (downshift direction or upshift direction) with a single operation of the gear shifter (brake/derailleur operating unit).

Since the shift signals SD1, SD2, and SD3 (or SU1, SU2, and SU3) turn on and off at different movement positions of the first operating member 32 (second operating member 34) along the operating direction of thereof, the signals will not readily turn on and off in a frequent manner even if the first operating member 32 (or second operating member 34) moves in the operating direction due to vibrations. As a result, unintended operation of the rear derailleur 97r resulting from vibrations can be prevented.

Other Embodiments

Although the previous embodiment illustrates a case in which the bicycle shifting device is a rear derailleur, the present invention can also be applied to a shift operating device for operating a front derailleur for a front sprocket having three or more sprockets or an internal hub transmission having three or more shift positions.

Although the previous embodiment illustrates a case in which the shift operating device is a brake/derailleur operating unit configured to operate a brake as well as shift gears, the present invention can also be applied to a standalone shift operating device configured only to shift gears.

Although the previous embodiment illustrates a case in which shifting by up to three positions can be executed with a single shift operation, the present invention can also be applied to a shift operating device configured to execute shifting by up to two positions with a single shift operation.

Although in the previous embodiment stationary contacts having a plurality of patterns are used in the first and second signal generators, it is also acceptable to use existing switches or the like that are commercially available and have a stationary contact and a moving contact in order to generate the signals for shifting the bicycle shifting device by one position or a plurality of positions.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward", "front", "rearward", "rear", "left", "right", "above", "below", "upper", "lower", "downward", "vertical", "horizontal", "longitudinal" and "transverse" as well as any other similar directional terms refer to those directions of a bicycle equipped with the present invention. The terms "left" and "right" refer to the left and right sides or left and right directions of the bicycle when the bicycle is viewed from the rear. Accordingly, these terms, as utilized to describe the present invention should be interpreted relative to a bicycle equipped with the present invention as used in the normal riding position. Finally, terms of degree such as "substantially", "about" and "approximately"

as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device for operating an electrically controlled bicycle shifting device, the bicycle shift operating device comprising:
   a mounting part configured to be mounted to a bicycle handlebar;
   a first operating member movable relative to the mounting part from a first operation start position such that the first operating member returns to the first operation start position upon completion of a shifting operation; and
   a first signal generator configured to generate a signal for changing a shift position of the bicycle shifting device by one shift position in a first direction from a current shift position in response to the first operating member being moved from the first operation start position to a first position, the first signal generator being further configured to generate a signal for changing the shift position of the bicycle shifting device by two shift positions from the current shift position in response to the first operating member being moved from the first operation start position to a second position located beyond the first position.

2. The bicycle shift operating device as recited in claim 1, wherein
   the first signal generator is further configured to generate a signal for changing the shift position of the bicycle shifting device by three shift positions from the current shift position in response to the first operating member being moved from the first operation start position to a third position located beyond both the first position and the second position.

3. The bicycle shift operating device as recited in claim 1, wherein
   the first operating member is pivotally connected to the mounting part to pivot about a first axis.

4. The bicycle shift operating device as recited in claim 3, wherein
   the mounting part includes a body portion and a support member pivotally connected to the body portion to pivot about a second axis that is non-aligned with respect to the first axis; and
   the first operating member is pivotally connected to the support member to pivot about the first axis and connected to the support member to pivot together with the support member about the second axis to perform a braking operation.

5. The bicycle shift operating device as recited in claim 1, wherein
   the first signal generator includes:
   a first movable contact operatively connected to the first operating member to move in accordance with movement of the first operating member; and
   a first stationary contact non-rotatably mounted relative to the mounting part to selectively contact and separate from the first movable contact.

6. The bicycle shift operating device as recited in claim 1, further comprising
   a second operating member movable relative to the mounting part from a second operation start position such that the second operating member returns to the second operation start position upon completion of a shifting operation; and
   a second signal generator configured to generate a signal for changing the shift position of the bicycle shifting device by one position in a second direction from the current shift position in response to the second operating member being moved from the second operation start position to a fourth position, and the second signal generator being further configured to generate a signal for changing the shift position of the bicycle shifting device by two positions from the current shift position in response to the second operating member being moved from the second operation start position to a fifth position located beyond the fourth position.

7. The bicycle shift operating device as recited in claim 6, wherein
   the second operating member is pivotally connected to the mounting part to pivot about the first axis.

8. The bicycle shift operating device as recited in claim 7, wherein
   the first and second operating members pivot in the same direction from the first and second operation start positions to the first and fourth positions, respectively.

9. The bicycle shift operating device as recited in claim 6, wherein
   the second signal generator includes:
   a second movable contact operatively connected to the second operating member to move in accordance with movement of the second operating member; and
   a second stationary contact non-rotatably mounted relative to the mounting part to selectively contact and separate from the second movable contact.

10. The bicycle shift operating device as recited in claim 9, wherein
    the second operating member is pivotally connected to the first operating member to pivot independently of the first operating member when the second operating member pivots from the second operation start position and to pivot integrally with the first operating member when the first operating member pivots from the first operation start position.

11. The bicycle shift operating device as recited in claim 1, further comprising
    an position indicating mechanism configured to provide an indication of an operating position of the first operating member, with the position indicating mechanism being configured to issue a first indication between the first operation start position and the first position of the first operating member and a second indication between the first position and the second position of the first operating member.

12. The bicycle shift operating device as recited in claim 6, wherein
    the first stationary contact includes a first pattern, and a second pattern spaced apart from the first pattern along a direction that intersects with a movement direction of the first movable contact and offset with respect to the first pattern along the movement direction.

13. The bicycle shift operating device as recited in claim 12, wherein
    the first stationary contact further includes a third pattern spaced apart from the first pattern along the movement direction, and a fourth pattern spaced apart from the second pattern along the movement direction and offset with respect to the third pattern along the movement direction.

14. The bicycle shift operating device as recited in claim 5, wherein the first signal generator is configured to turn on a signal for changing the shift position of the bicycle shift operating device by one position in a first direction from the current shift position in response to the first operating member being moved from the first operation start position to a first position, and the first signal generator being further configured to turn off the signal in response to the first operating member reaching a position different from the position where the signal was turned on while in the process of returning from the first position to the first operation start position.

15. The bicycle shift operating device as recited in claim 14, wherein the first stationary contact includes a first pattern, and a second pattern spaced apart from the first pattern along a direction that intersects with a movement direction of the first movable contact and offset with respect to the first pattern along the movement direction.

16. The bicycle shift operating device as recited in claim 15, wherein the first stationary contact further includes a third pattern spaced apart from the first pattern along the movement direction, and a fourth pattern spaced apart from the second pattern along the movement direction and offset with respect to the third pattern along the movement direction.

* * * * *